(12) United States Patent
Araki et al.

(10) Patent No.: US 12,283,403 B2
(45) Date of Patent: Apr. 22, 2025

(54) INSULATED ELECTRIC WIRE, WIRE HARNESS, AND INSULATED ELECTRIC WIRE PRODUCTION METHOD

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Kenichiro Araki, Yokkaichi (JP); Toyoki Furukawa, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 165 days.

(21) Appl. No.: 18/016,955

(22) PCT Filed: Aug. 2, 2021

(86) PCT No.: PCT/JP2021/028573
§ 371 (c)(1),
(2) Date: Jan. 19, 2023

(87) PCT Pub. No.: WO2022/030434
PCT Pub. Date: Feb. 10, 2022

(65) Prior Publication Data
US 2023/0352210 A1    Nov. 2, 2023

(30) Foreign Application Priority Data

Aug. 5, 2020 (JP) .................. 2020-133409

(51) Int. Cl.
*H01B 7/28* (2006.01)
*H01B 7/00* (2006.01)
(Continued)

(52) U.S. Cl.
CPC ......... *H01B 7/0876* (2013.01); *H01B 7/0045* (2013.01); *H01B 7/2825* (2013.01); *H01B 7/285* (2013.01); *H01B 7/38* (2013.01)

(58) Field of Classification Search
CPC ............................... H01B 7/285; H01B 13/32
See application file for complete search history.

(56) References Cited

U.S. PATENT DOCUMENTS 5,536,904 A    7/1996   Kojima et al.
9,190,743 B2   11/2015  Sato et al.
(Continued)

FOREIGN PATENT DOCUMENTS

JP    H06-086221 A    3/1994
JP    2000-011771 A   1/2000
(Continued)

OTHER PUBLICATIONS

Oct. 12, 2021 Search Report issued in International Patent Application No. PCT/JP2021/028573.
(Continued)

*Primary Examiner* — Chau N Nguyen
(74) *Attorney, Agent, or Firm* — Oliff PLC

(57) ABSTRACT

An insulated electric wire includes: an exposed portion and a covered portion including the insulation covering, and further includes a water-stopping portion wherein a water-stopping agent is placed over the exposed portion, and part of the covered portion and is adjacent to the exposed portion. The water-stopping portion continuously has: an inter-elemental-wire filling area filled with the water-stopping agent in gaps between conductor elemental wires; an exposed- (Continued)

portion-outer-circumferential area wherein the water-stopping agent covers an outer circumference of the conductor; and a covered-portion-outer-circumferential area wherein the water-stopping agent covers an outer circumference of the insulation covering. In a subject region that is a part of the exposed-portion-outer-circumferential area and is other than a region closer to the covered-portion-outer-circumferential area with a larger outer diameter due to a thickness of the insulation covering, a difference between a maximum and minimum outer diameter is not greater than 12% of the minimum outer diameter.

12 Claims, 11 Drawing Sheets

(51) Int. Cl.
*H01B 7/08* (2006.01)
*H01B 7/282* (2006.01)
*H01B 7/285* (2006.01)
*H01B 7/38* (2006.01)

(56) References Cited

U.S. PATENT DOCUMENTS

| | | | |
|---|---|---|---|
| 2013/0199842 | A1 | 8/2013 | Inoue et al. |
| 2014/0299353 | A1 | 10/2014 | Saito |
| 2020/0286648 | A1 | 9/2020 | Furukawa |

FOREIGN PATENT DOCUMENTS

| | | |
|---|---|---|
| JP | 2012-084407 A | 4/2012 |
| JP | 2013-097922 A | 5/2013 |
| WO | 2012/053275 A1 | 4/2012 |
| WO | 2019/021851 A1 | 1/2019 |

OTHER PUBLICATIONS

Jan. 27, 2025 Office Action issued in Indian Patent Application No. 202317003085.

[7A]

[7B]

[7C]

[12A]

[12B]

INSULATED ELECTRIC WIRE, WIRE HARNESS, AND INSULATED ELECTRIC WIRE PRODUCTION METHOD

TECHNICAL FIELD

The present disclosure relates to an insulated electric wire, a wire harness, and an insulated electric wire production method.

BACKGROUND ART

In some cases, water-stopping treatment is applied to a portion of an insulated electric wire in the longitudinal axis direction of the wire. For example, Patent Document 1 discloses an electric wire with a water-stopping portion, the electric wire including a stranded conductor and an insulation covering. The stranded conductor is continuous in the lengthwise direction, but the insulation covering is cut into appropriate lengths, and is discontinuous in the lengthwise direction. At portions where the insulation covering is cut and the stranded conductor is exposed, the gaps between elemental wires of the stranded conductor, and the gaps between the outer circumferential surface of the stranded conductor and cross sections of the insulation covering are filled with a water-stopping resin, and a water-stopping portion is formed. Additionally, the water-stopping resin adheres to the cross sections of the insulation covering.

CITATION LIST

Patent Document
Patent Document 1: JP 2000-11771 A

SUMMARY OF INVENTION

Technical Problem

In the configuration disclosed in Patent Document 1, when the water-stopping portion is formed, the water-stopping resin adheres to cross sections of the insulation covering on both sides of each portion where the stranded conductor is exposed, and the water-stopping portion is formed only at portions where the stranded conductor is exposed. In this case, the mechanical strength of the water-stopping portion weakens, and it may become impossible to maintain a sufficient water-stopping performance when the water-stopping portion or a portion near the water-stopping portion receives a mechanical load such as a load caused by bending of the electric wire. For example, when the electric wire is bent, damage such as a crack or a breakage of the water-stopping resin occurs near the adhesion interface with the insulation covering, and a reduction in the water-stopping performance may occur. Particularly, whereas the water-stopping portion is formed only in a very short region in the configuration shown in Patent Document 1, forming the water-stopping portion over a longer region increases the likelihood that any of portions in the longer region is influenced by a mechanical load.

Accordingly, an object of the present invention is to provide an insulated electric wire that includes a water-stopping portion which is highly durable against a mechanical load, a wire harness that includes such an insulated electric wire, and a method that can produce such an insulated electric wire.

Solution to Problem

An insulated electric wire of the present disclosure is an insulated electric wire including: a conductor in which a plurality of elemental wires made of a metal material are twisted together; and an insulation covering that covers an outer circumference of the conductor, in which the insulated electric wire includes: an exposed portion in which the insulation covering is removed from the outer circumference of the conductor; and a covered portion in which the insulation covering covers the outer circumference of the conductor, the exposed portion and the covered portion being provided adjacent to each other in a longitudinal axis direction, the insulated electric wire further includes a water-stopping portion in which a water-stopping agent is placed over the exposed portion, and a region that is a part of the covered portion and is adjacent to the exposed portion, the water-stopping portion continuously has: an inter-elemental-wire filling area where the water-stopping agent fills gaps between the elemental wires in the exposed portion; an exposed-portion-outer-circumferential area in which the water-stopping agent covers the outer circumference of the conductor in the exposed portion; and a covered-portion-outer-circumferential area in which the water-stopping agent covers an outer circumference of the insulation covering in a region that is a part of the covered portion and is adjacent to the exposed portion, defining a subject region as a region of the exposed-portion-outer-circumferential area other than a region closer to the covered-portion-outer-circumferential area which has an increased diameter due to a thickness of the insulation covering, a difference between a maximum outer diameter and a minimum outer diameter in the subject region is not greater than 12% of the minimum outer diameter.

A wire harness of the present disclosure has the insulated electric wire.

An insulated electric wire production method of the present disclosure is a method for producing the insulated electric wire, the insulated electric wire including a conductor in which a plurality of elemental wires made of a conductive material are twisted together; and an insulation covering that covers the outer circumference of the conductor, the method comprising, in this order: a partial exposure step of providing an exposed portion in which the insulation covering is removed from the outer circumference of the conductor, and a covered portion in which the insulation covering covers the outer circumference of the conductor, the exposed portion and the covered portion being provided adjacent to each other in a longitudinal axis direction of the insulated electric wire; a density modification step of widening distances between the elemental wires in the exposed portion while increasing a density of the conductive material per unit length in the exposed portion; a filling step of immersing a region that is a part of the insulated electric wire and includes the exposed portion in a liquid of a water-stopping agent made of an insulating material, and filling gaps between the elemental wires with the water-stopping agent; a pulling-up step of pulling up the insulated electric wire from the liquid of the water-stopping agent; and a retightening step of reducing the distances between the elemental wires in the exposed portion, and decreasing a twist pitch of the elemental wires.

Advantageous Effects of Invention

An insulated electric wire, a wire harness, and an insulated electric wire production method according to the present disclosure are an insulated electric wire that includes a water-stopping portion which is highly durable against a mechanical load, a wire harness that includes such an insulated electric wire, and a method that can produce such an insulated electric wire.

BRIEF DESCRIPTION OF DRAWINGS

FIG. 7A illustrates the insulated electric wire before the water-stopping portion is formed, FIG. 7B illustrates a partial exposure step, and FIG. 7C illustrates a tightening step.

FIG. 8A illustrates a loosening step, FIG. 8B illustrates a filling step, and FIG. 8C illustrates a pulling-up step.

FIG. 9A illustrates a winding step, FIG. 9B illustrates a retightening step, and FIG. 9C illustrates a covering movement step.

FIG. 11A illustrates a case where the diameter of the conductor is kept thick, and FIG. 11B illustrates a case where the diameter of the conductor is reduced.

FIG. 12A shows a sample A on which the retightening step has been executed after the pulling-up step, and FIG. 12B shows a sample B on which the retightening step has been executed before the pulling-up step.

DESCRIPTION OF EMBODIMENTS

Description of Embodiment of Present Disclosure

Figure 1:
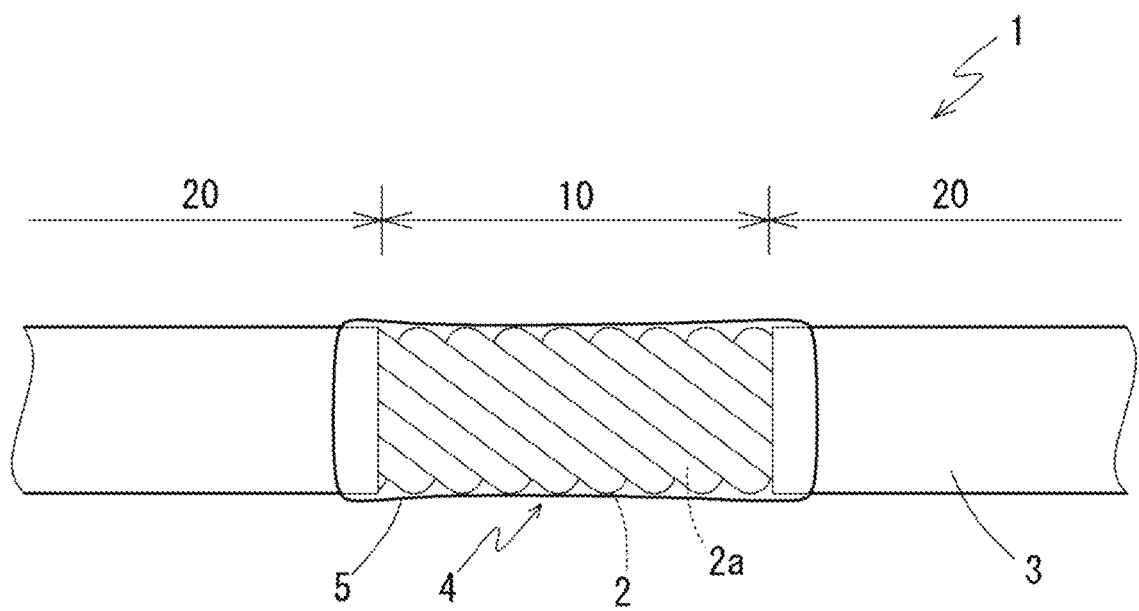
FIG. 1 is a perspective side view illustrating an insulated electric wire according to an embodiment of the present disclosure.

First, a description of an embodiment of the present disclosure is given in a list.

An insulated electric wire according to the present disclosure is an insulated electric wire including: a conductor in which a plurality of elemental wires made of a metal material are twisted together; and an insulation covering that covers an outer circumference of the conductor, in which the insulated electric wire includes: an exposed portion in which the insulation covering is removed from the outer circumference of the conductor; and a covered portion in which the insulation covering covers the outer circumference of the conductor, the exposed portion and the covered portion being provided adjacent to each other in a longitudinal axis direction, the insulated electric wire further includes a water-stopping portion in which a water-stopping agent is placed over the exposed portion, and a region that is a part of the covered portion and is adjacent to the exposed portion, the water-stopping portion continuously has: an inter-elemental-wire filling area where the water-stopping agent fills gaps between the elemental wires in the exposed portion; an exposed-portion-outer-circumferential area in which the water-stopping agent covers the outer circumference of the conductor in the exposed portion; and a covered-portion-outer-circumferential area in which the water-stopping agent covers an outer circumference of the insulation covering in a region that is a part of the covered portion and is adjacent to the exposed portion, defining a subject region as a region of the exposed-portion-outer-circumferential area other than a region closer to the covered-portion-outer-circumferential area which has an increased diameter due to a thickness of the insulation covering, a difference between a maximum outer diameter and a minimum outer diameter in the subject region is not greater than 12% of the minimum outer diameter.

The insulated electric wire has the water-stopping portion including three continuous regions which are: the inter-elemental-wire filling area where the water-stopping agent fills the gaps between the elemental wires of the conductor exposed at the exposed portion; the exposed-portion-outer-circumferential area in which the water-stopping agent covers the outer circumference of the conductor at the exposed portion; and the covered-portion-outer-circumferential area in which the water-stopping agent covers an end region of the covered portion. Since, in the covered-portion-outer-circumferential area, the water-stopping agent contacts and covers the outer circumferential surface of the insulation covering, the water-stopping portion is easily held rigidly in the covered electric wire as compared with the case where the water-stopping portion has only the inter-elemental-wire filling area and the exposed-portion-outer-circumferential area, and the water-stopping performance of the water-stopping portion is likely to be maintained even if the electric wire receives a mechanical load such as a bending load. Furthermore, since, in the subject region in the exposed-portion-outer-circumferential area, the difference between the maximum outer diameter and the minimum outer diameter is kept at not greater than 12% of the minimum outer diameter, the outer diameter of the water-stopping portion does not have significant changes in the longitudinal axis direction, but is highly uniform. Accordingly, the water-stopping agent is likely to exhibit its material strength that it has by nature with high uniformity over the entire water-stopping portion, and a mechanical load generated by bending or the like is also easily dispersed over the entire water-stopping portion with high uniformity. As a result, a situation where a mechanical load is concentrated at a portion that is a part of the water-stopping portion and has a smaller outer diameter or the like, and a reduction in the water-stopping performance occurs is unlikely to occur. Even if the water-stopping portion is also formed over a long region, outer-diameter uniformity of the long region is kept high, and accordingly a reduction in the water-stopping performance due to a mechanical load is unlikely to occur.

Here, in the subject region, the difference between the maximum outer diameter and the minimum outer diameter is preferably at least 1% of the minimum outer diameter. In this case, the water-stopping portion which is sufficiently unlikely to be influenced by a mechanical load can be formed without making excessive efforts for improving the outer-diameter uniformity of the water-stopping portion.

Preferably, the insulated electric wire includes the covered portion and the covered-portion-outer-circumferential area on each side of the exposed portion in the longitudinal axis direction, and the maximum outer diameter is observed at either one of two central regions obtained by equally dividing the subject region into four in the longitudinal axis direction. If the water-stopping portion is formed by using a water-stopping agent in a liquid state, dropping of the water-stopping agent tends to cause regions in and near the central portion of the subject region to have a smaller outer diameter than in the region on either side, as non-uniformity of the outer diameter of the water-stopping portion. However, if it is possible to suppress occurrence of outer-diameter non-uniformity due to dropping of the water-stopping agent, it is possible to form the water-stopping portion with larger outer diameters in regions near the central portion of the subject region than in regions on both sides. That is, the feature that a portion forming the maximum outer diameter in the subject region is present near the central portion in the lengthwise direction functions as a good indicator of high outer-diameter uniformity of the water-stopping portion, and the water-stopping portion is highly durable against a mechanical load at each position in the longitudinal axis direction.

It is preferable that the water-stopping portion does not have a portion with an outer diameter smaller than an outer diameter of a portion that is a part of the covered portion and does not have the water-stopping agent placed thereon. This means that the water-stopping portion is not provided with a portion with an extremely small outer diameter, and functions as a good indicator of high outer-diameter uniformity of the water-stopping portion along the longitudinal direction.

It is preferable that the thickness of the layer of the water-stopping agent is larger in the exposed-portion-outer-circumferential area than in the covered-portion-outer-circumferential area. This brings about an effect that the layer of the water-stopping agent constituting the exposed-portion-outer-circumferential area exhibits a high strength. Also when a mechanical load is applied, the load is unlikely to be transferred to the exposed-portion-outer-circumferential area or the inter-elemental-wire filling area, and a superior water-stopping performance is easily maintained at the exposed portion. For example, when the insulated electric wire is bent, the insulated electric wire is unlikely to be bent at the position of the exposed portion due to the presence of a thick layer of the water-stopping agent in the exposed-portion-outer-circumferential area.

It is preferable that the water-stopping portion does not have a difference in height equal to or greater than the thickness of the layer of the water-stopping agent in the covered-portion-outer-circumferential area on the outer circumferential surface except in the end portion in the longitudinal axis direction. Furthermore, it is preferable that the water-stopping portion does not have a difference in height equal to or greater than 20% of the thickness of the layer of the water-stopping agent in the covered-portion-outer-circumferential area on the outer circumferential surface except in the end portion in the longitudinal axis direction. This means that the outer circumferential surface does not have a structure with a significant inclination or an irregular structure over the entire region of the water-stopping portion including the subject region, but has a straight structure. As a result, even if the water-stopping portion receives a mechanical load, a large load is not concentrated at a particular portion, and a superior water-stopping performance can easily be maintained as the entire water-stopping portion.

It is preferable that a thickness of a layer of the water-stopping agent in the covered-portion-outer-circumferential area is smaller than the thickness of the insulation covering. Since this brings about an effect of making it possible to keep the covered portion in an easily bendable state without being impaired by the layer of the water-stopping agent, when the insulated electric wire is bent at the water-stopping portion or a portion near the water-stopping portion, the covered portion absorbs the bending, and the exposed portion can easily be maintained in an unbent state. As a result, the water-stopping performance at the exposed portion can be maintained high.

It is preferable that, at an end portion of the covered-portion-outer-circumferential area corresponding to an end portion of the entire water-stopping portion in the longitudinal axis direction, the water-stopping portion has a taper structure in which a layer of the water-stopping agent decreases in thickness outward an outer side in the longitudinal axis direction. This brings about an effect of making it unlikely for the end portion of the water-stopping portion to receive concentrated stress also when the insulated electric wire receives a mechanical load such as a bending load, and a state in which the water-stopping agent adheres to the insulation covering can be easily maintained. As a result, a superior water-stopping performance is likely to be kept.

A wire harness of the present disclosure has the insulated electric wire. As described above, the wire harness of the present disclosure includes the insulated electric wire having a water-stopping performance which is unlikely to be impaired by a mechanical load, and even in a situation where a mechanical load such as a bending load is applied, the wire harness as a whole can maintain a superior water-stopping performance.

An production method for an insulated electric wire for producing the insulated electric wire according to the present disclosure, the method comprising in this order: a partial exposure step of providing, to an insulated electric wire comprising a conductor in which a plurality of elemental wires made of a conductive material are twisted together; and an insulation covering that covers the outer circumference of the conductor; an exposed portion in which the insulation covering is removed from the outer circumference of the conductor, and a covered portion in which the insulation covering covers the outer circumference of the conductor, the exposed portion and the covered portion being provided adjacent to each other in a longitudinal axis direction of the insulated electric wire; a density modification step of widening distances between the elemental wires in the exposed portion while increasing a density of the conductive material per unit length in the exposed portion; a filling step of immersing a region that is a part of the insulated electric wire and includes the exposed portion in a liquid of a water-stopping agent made of an insulating material, and filling gaps between the elemental wires with the water-stopping agent; a pulling-up step of pulling up the insulated electric wire from the liquid of the water-stopping agent; and a retightening step of reducing the distances between the elemental wires in the exposed portion, and decreasing a twist pitch of the elemental wires.

In the production method, when the insulated electric wire is pulled up from the liquid of the water-stopping agent in the pulling-up step after the region that is a part of the insulated electric wire and includes the exposed portion is immersed in the liquid of the water-stopping agent in the filling step, it is possible to attain a state in which the water-stopping agent is placed not only in the areas between the elemental wires but also on an outer circumferential portion in a region including the exposed portion. By executing the retightening step of reducing the twist pitch of the elemental wires in order to make it easy to hold the water-stopping agent in the areas between the elemental wires after the pulling-up step, the pulling-up step is executed in a state in which the diameter of the conductor is thick as compared with the case where the retightening step is completed in the liquid of the water-stopping agent before the pulling-up step. This brings about an effect of making it possible to execute the pulling-up step while maintaining a state where a large amount of the water-stopping agent is placed on the outer circumferential portion of the exposed portion. This makes it easier to attain a state in which the water-stopping agent does not densely drop at particular portions including the central portion of the exposed portion, but drops with high uniformity in the longitudinal axis direction during or after the pulling-up step. As a result, the outer-diameter uniformity, in the longitudinal axis direction, of the water-stopping portion to be formed becomes high, and a water-stopping portion that is highly durable against a mechanical load such as a bending load at each position can be formed easily.

Here, it is preferable that a winding step of rotating the insulated electric wire around its axis, and winding the dropping water-stopping agent around an outer circumference of the insulated electric wire is executed after the pulling-up step or before or during the retightening step. This makes it easier to make the dropping water-stopping agent remain on the surface of the exposed-portion-outer-circumferential area, and to form a water-stopping portion having a sufficient thickness. As described above, since dropping of the water-stopping agent occurs with high uniformity in the longitudinal axis direction by executing the retightening step after the pulling-up step, the thickness uniformity of the water-stopping agent formed in the winding step can be increased easily.

Details of Embodiment of Present Disclosure

A detailed description of an insulated electric wire, a wire harness, and a production method for producing the insulated electric wire according to embodiments of the present disclosure will now be provided with reference to the drawings.

<Configuration of Insulated Electric Wire>
Overview of Insulated Electric Wire

Figure 2:
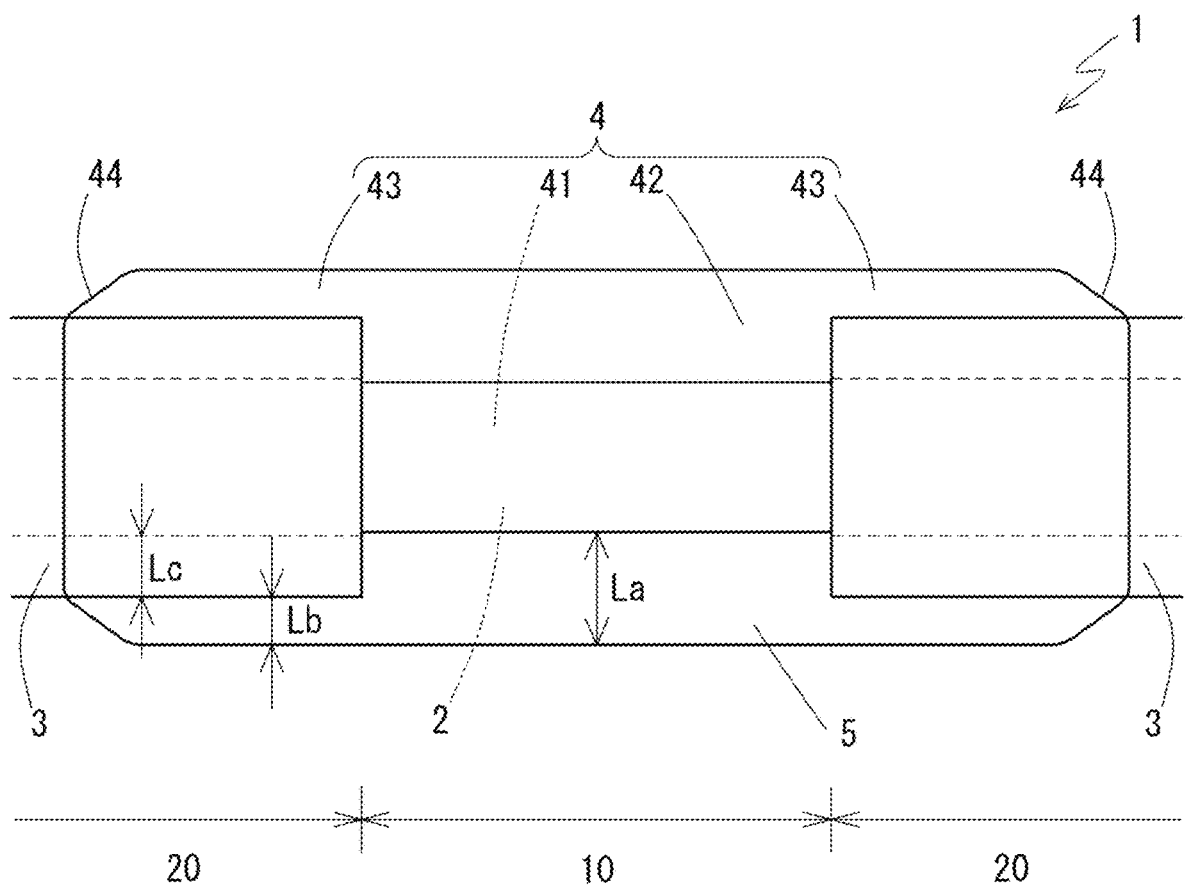
FIG. 2 is a perspective side view illustrating, in an exaggerated manner, ideal configuration not having an outer diameter distribution of a water-stopping portion. Here, elemental wires constituting a conductor are not shown, but omitted.
Figure 3:
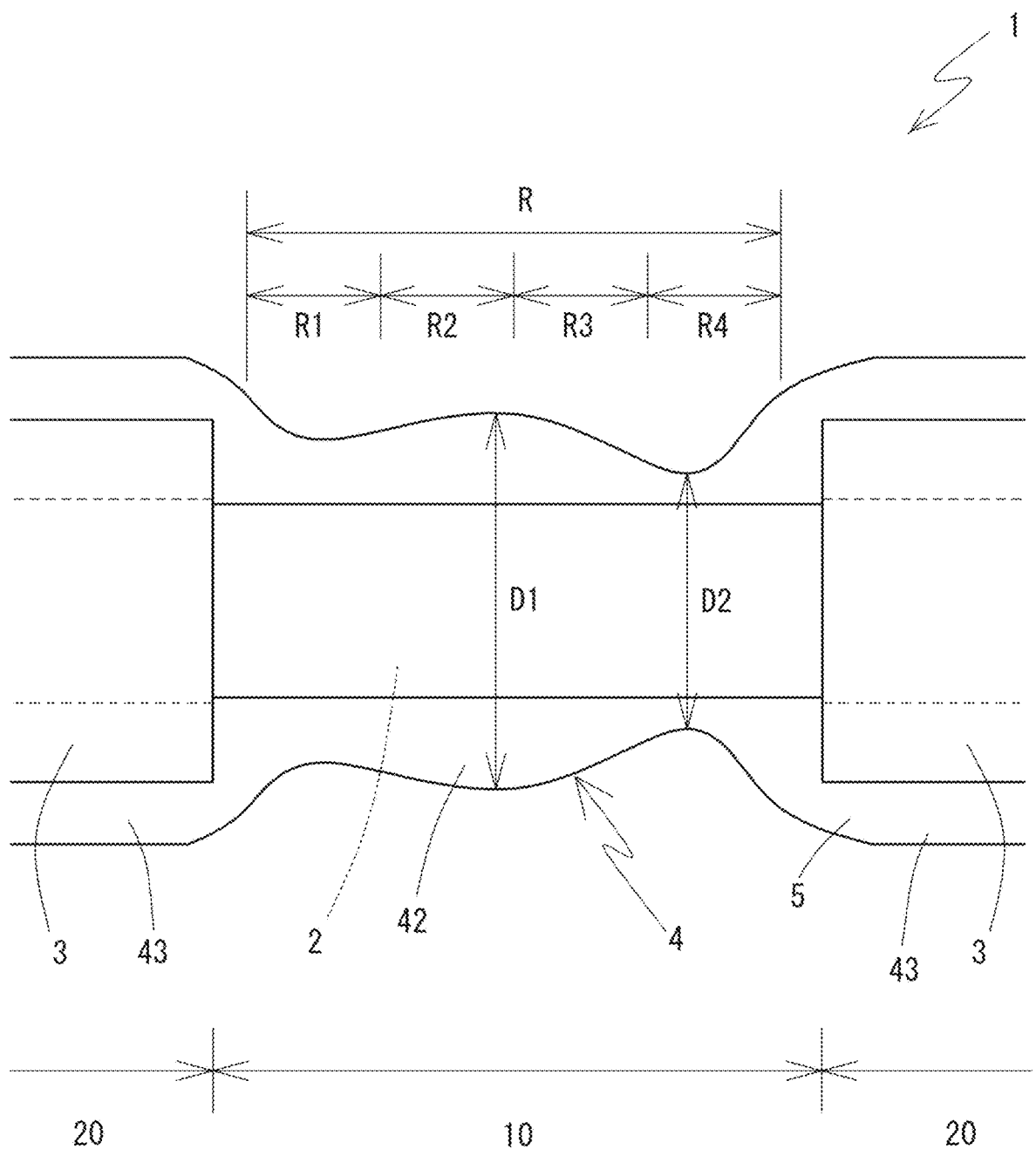
FIG. 3 is a perspective side view illustrating, in an exaggerated manner, configuration having an outer diameter distribution of the water-stopping portion, and is an enlarged view of portions near an exposed portion. Here, the elemental wires constituting the conductor are not shown, but omitted.
Figure 4:
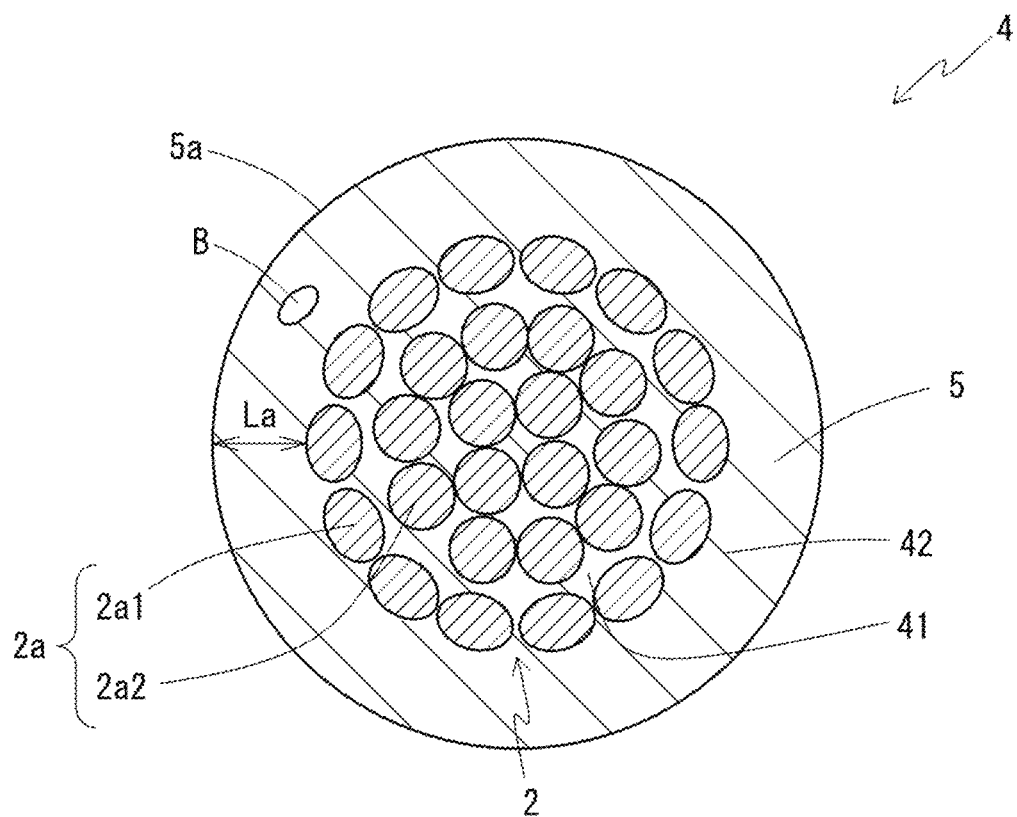
FIG. 4 is a cross-sectional view illustrating an example of the state of a cross section of the water-stopping portion.

FIG. 1 illustrates an overview of an insulated electric wire 1 according to an embodiment of the present disclosure. Further, FIG. 2 illustrates, in an exaggerated manner, configuration of a water-stopping portion 4 of the insulated electric wire 1 in which the outer diameter of the water-stopping portion 4 does not have a distribution, and FIG. 3 illustrates, in an exaggerated manner, configuration of the water-stopping portion 4 in which the outer diameter of the water-stopping portion has a distribution. In addition, FIG. 4 illustrates an example of the cross section of the water-stopping portion 4 taken perpendicular to the axial direction of the insulated electric wire 1.

The insulated electric wire 1 according to a first embodiment of the present disclosure includes a conductor 2 in which a plurality of elemental wires 2a made of a metal material are twisted together, and an insulation covering 3 that covers the outer circumference of the conductor 2. A water-stopping portion 4 is formed in a middle portion of the insulated electric wire 1 in a longitudinal axis direction thereof.

The elemental wires 2a constituting the conductor 2 may be made of any kind of metal material, and, as a material for an insulated electric wire, copper is commonly used. In addition to copper, other metal materials such as aluminum, magnesium, and iron may also be used. The metal material may be an alloy. Examples of additive metal elements that can be used to form an alloy include iron, nickel, magnesium, silicon, and combinations thereof. All of the elemental wires 2a may be made of the same metal material, or may include elemental wires 2a made of multiple metal materials There is no particular limitation to the twist structure of the elemental wires 2a of the conductor 2, but a simple twist structure is preferable in view of, for example, easily increasing distances between the elemental wires 2a when the water-stopping portion 4 is formed. For example, a twist structure in which the elemental wires 2a are collectively twisted all together is preferred rather than a master-slave twist structure in which a plurality of strands each containing a plurality of twisted elemental wires 2a are gathered and further twisted. Also, there is no particular limitation to the diameter of the whole conductor and the diameter of each elemental wire 2a. However, the effect and significance of filling minute gaps between the elemental wires 2a in the water-stopping portion 4 with the water-stopping agent to improve reliability of the water-stopping characteristic is greater as the diameters of the whole conductor 2 and each elemental wire 2a are smaller, and thus it is preferable that the cross section of the conductor be about 8 mm$^2$ or smaller and the diameter of individual elemental wires be about 0.45 mm or smaller.

There is no particular limitation to the material constituting the insulation covering 3 as long as it is an insulating polymer material. Examples of such materials include a polyvinyl chloride (PVC) resin and an olefin-based resin. In addition to the polymer material, a filler or an additive may be contained as appropriate. Further, the polymer material may be cross-linked.

The water-stopping portion 4 includes an exposed portion in which the insulation covering 3 is removed from the outer circumference of the conductor 2. In the exposed portion 10, gaps between the elemental wires 2a constituting the conductor 2 are filled with the water-stopping agent 5, constituting an inter-elemental-wire filling area 41.

Furthermore, the water-stopping portion 4 has an exposed-portion-outer-circumferential area 42 in which the water-stopping agent 5 covers the outer circumference of the conductor 2 in the exposed portion 10 continuously from the inter-elemental-wire filling area 41 in which the water-stopping agent 5 fills the gaps between the elemental wires 2a in the exposed portion 10. Moreover, the water-stopping portion 4 has covered-portion-outer-circumferential areas 43 continuously from the inter-elemental-wire filling area 41 and the exposed-portion-outer-circumferential area 42. In the covered-portion-outer-circumferential areas 43, the water-stopping agent 5 covers the outer circumferences of end portions of covered portions 20 adjacent to each side of the exposed portion 10, that is, the outer circumference of the insulation covering 3 in regions adjacent to the exposed portion 10 in regions in which the insulation covering 3 is kept covering the outer circumference of the conductor 2. That is, in the water-stopping area 4, the water-stopping agent 5 continuously covers the outer circumference, preferably the entire circumferential portion, of a region extending from a portion of an end portion of the covered portion 20 located on one side of the exposed portion 10 to a portion of an end portion of the covered portion 20 located on the other side of the exposed portion 10. Further, the water-stopping agent fills up the areas between the elemental wires 2a in the exposed portion 10 continuously from that outer circumferential portion. Details of the structure of the water-stopping portion 4 will be described later.

There is no particular limitation to the material constituting the water-stopping agent 5 as long as it is an insulating material through which a fluid such as water is unlikely to pass and that can exhibit a water-stopping performance. However, the water-stopping agent 5 is preferably made of an insulating resin composition, particularly a thermoplastic resin composition or a curable resin composition due to the reason that it easily fills up the gaps between the elemental wires 2a in a high flowability state, for example. By placing such a resin composition in a high flowability state between the elemental wires 2a and on the outer circumferences (outer circumferential areas) of end portions of the exposed portion 10 and the covered portions 20, and then bringing the resin composition to a low flowability state, it is possible to reliably form a water-stopping portion 4 having a superior water-stopping performance. A preferable configuration of constituting materials of the water-stopping agent 5 will be described later.

As described above, when the water-stopping agent 5 fills the gaps between the elemental wires 2a in the exposed portion 10 and constitutes the inter-elemental-wire filling area 41, water stopping is realized at the areas between the elemental wires 2a, and a fluid such as water is prevented from entering the areas between the elemental wires 2a from the outside. In addition, even if water enters a gap between the elemental wires 2a in one portion of the insulated electric wire 1, the water is prevented from moving to another portion of the insulated electric wire 1 along the elemental wires 2a. For example, water adhering to one end of the insulated electric wire 1 can be prevented from moving toward the other end of the insulated electric wire 1 through a gap between the elemental wires 2a.

The exposed-portion-outer-circumferential area 42 in which the water-stopping agent 5 covers the outer circumferential portion of the conductor 2 in the exposed portion 10 has the function of physically protecting the exposed portion 10. Moreover, if the water-stopping agent 5 is made of an insulating material, the exposed-portion-outer-circumferential area 42 has the function of insulating the conductor 2 in the exposed portion 10 against the outside. Also, since the water-stopping portion 4 has the covered-portion-outer-circumferential areas 43 in which the water-stopping agent 5 also covers the outer circumferences of the end portions of the covered portions 20 adjacent to the exposed portion 10 as one piece, water stopping is possible between the insulation covering 3 and the conductor 2. That is to say, a fluid such as water is prevented from entering the gap between the insulation covering 3 and the conductor 2 from the outside. Further, even if water enters a gap between the insulation covering 3 and the conductor 2 in one portion of the insulated electric wire 1, the water is prevented from moving to another portion of the insulated electric wire 1 through the gap between the insulation covering 3 and the conductor 2. For example, water adhering to one end of the insulated electric wire 1 can be prevented from moving toward the other end of the insulated electric wire 1 through the gap between the insulation covering 3 and the conductor 2. Since the water-stopping portion 4 includes the covered-portion-outer-circumferential areas 43 continuously from the inter-elemental-wire filling area 41 and the exposed-portion-outer-circumferential area 42, the water-stopping area 4 as a whole attains a high mechanical strength, and the water-stopping structure by the water-stopping portion 4 is likely to hold the insulated electric wire 1 reliably. As a result, even if a mechanical load such as a bending load is applied to the insulated electric wire 1, the water-stopping structure at the water-stopping portion 4 can be maintained rigidly.

Note that in the present embodiment, the water-stopping portion 4 is provided in a middle portion of the insulated electric wire 1 in the longitudinal axis direction thereof in view of the magnitude of demand, easiness in increasing the distances between the elemental wires 2a, and the like, and the covered portions 20 and the covered-portion-outer-circumferential areas 43 are provided on each side of the exposed portion 10 in the longitudinal axis direction, but the same water-stopping portion 4 may also be provided at an end portion of the insulated electric wire 1 in the longitudinal axis direction thereof. In this case, another member such as a terminal may be connected to the end portion of the insulated electric wire 1, or no member may be connected thereto. Also, the water-stopping portion 4 covered with the water-stopping agent 5 may include, in addition to the conductor 2 and the insulation covering 3, another member such as a connection member. Examples of the case where the water-stopping portion 4 includes another member include a case where the water-stopping portion 4 includes a splice portion in which a plurality of insulated electric wires 1 are joined to each other.

The outer circumference of the water-stopping portion 4 may be provided with a protective material such as a tube or a tape made of a resin material or the like. Installation of the protective material enables protection of the water-stopping portion 4 against a physical stimulate such as contact with an external object. Also, if the water-stopping agent 5 includes a curable resin, due to the ageing of the water-stopping agent 5, damage may be caused to the water-stopping agent 5 when the water-stopping portion 4 is bent or vibrated. However, by providing the protective material on the outer circumference of the water-stopping portion 4, it becomes possible to decrease the occurrence of such damage. In view of effectively decreasing the influence of bending or vibration on the water-stopping portion 4, it is preferable that the protective material is made of a material with a rigidity at least higher than that of the water-stopping agent 5 constituting the water-stopping portion 4. For example, the protective material can be placed by winding in a spiral shape a tape material having an adhesion layer around the outer circumference of the insulated electric wire 1 including the water-stopping portion 4.

Constituent Material of Water-Stopping Agent

As described above, in the insulated electric wire 1 according to the present embodiment, the water-stopping agent 5 constituting the water-stopping portion 4 is preferably made of a curable resin composition. A curable resin is a resin having one or more of types of curability such as heat curability, light curability, moisture curability, two-component curability, and anaerobic curability. Preferably, in view of a superior curability in a short time or the like, the water-stopping agent 5 preferably has light curability or anaerobic curability, and further preferably has both the types of curability.

There is no particular limitation to the specific type of the resin constituting the water-stopping agent 5. Examples of the resin include silicone resins, acrylic resins, epoxy resins, and urethane resins. To the resin material, various kinds of additives can be appropriately added as long as the characteristics of the resin material as the water-stopping agent 5 are not deteriorated. Also, it is preferable to use only one type of water-stopping agent in view of simplicity of the configuration, but two or more types of water-stopping agent 5 may also be combined or stacked, for example, as appropriate.

Figure 11:
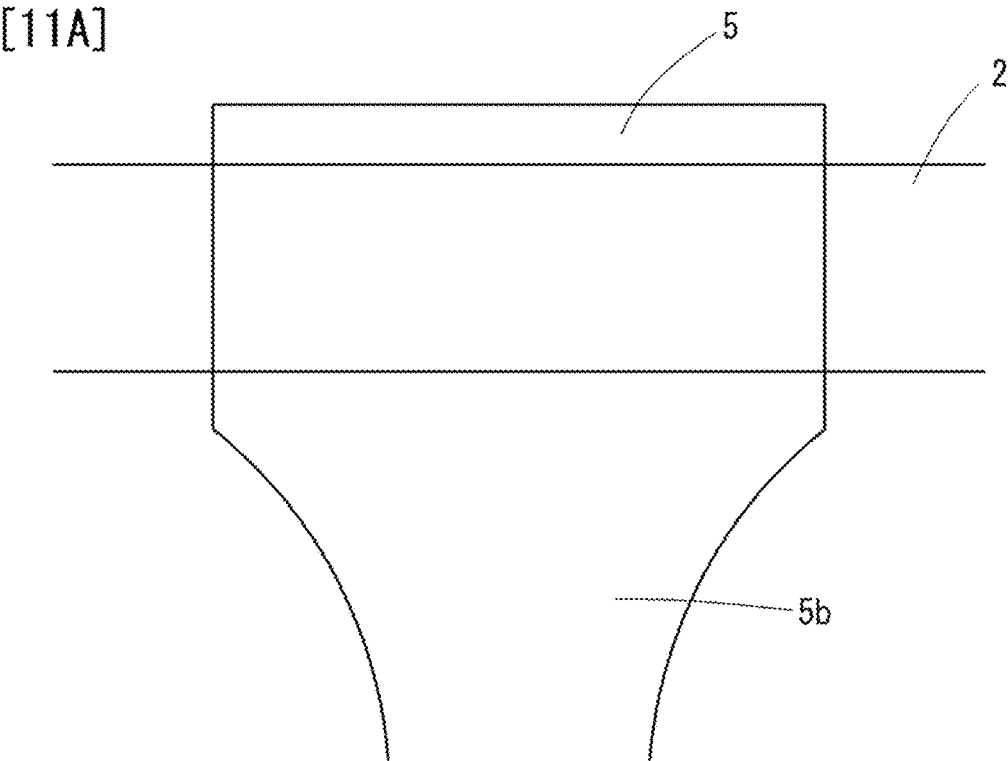
FIGS. 11A and 11B are figures schematically illustrating the conductor and the water-stopping agent in the state where the insulated electric wire is pulled up from a liquid of the water-stopping agent.
Figure 11:
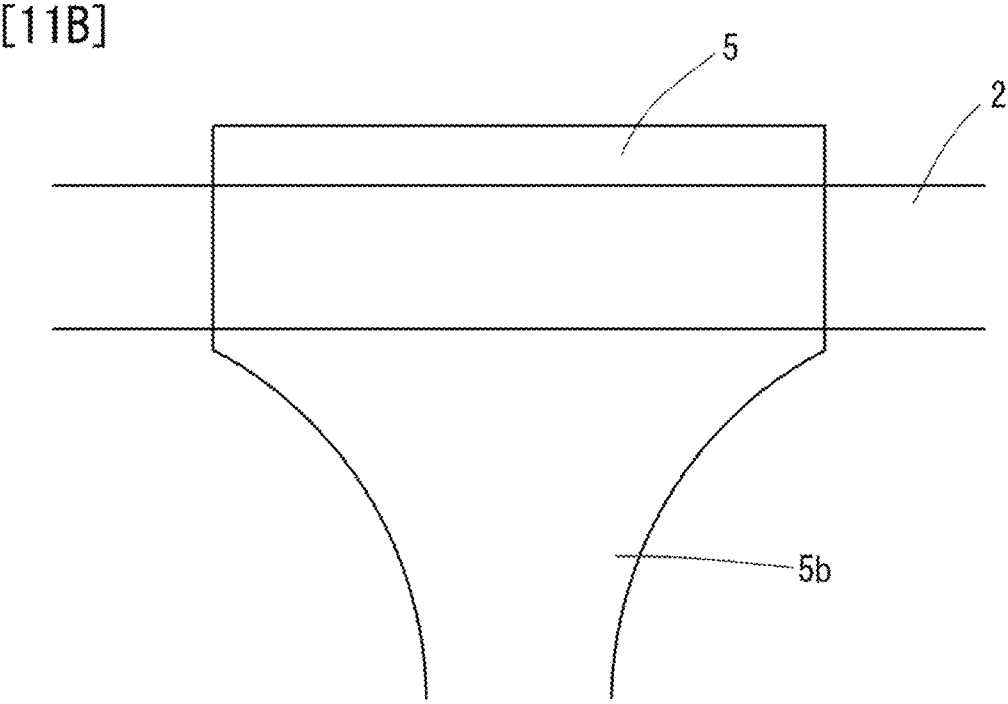

It is preferable that the water-stopping agent 5 be a resin composition having a viscosity of at least 4000 mPa·s, more preferably at least 5000 mPa·s upon filling. This is because, when the water-stopping agent 5 is placed at the areas between the elemental wires 2a and on the outer circumferential areas, especially on the outer circumferential areas, the water-stopping agent 5 hardly drops or flows and is likely to stay at the areas with high uniformity. On the other hand, it is preferable that the viscosity of the water-stopping agent 5 upon filing be kept at 200,000 mPa·s at the most, more preferably 10,000 mPa·s at the most. This is because, when the viscosity is too high, it is difficult to permeate the water-stopping agent 5 into the areas between the elemental wires 2a sufficiently. Also, the resin composition having the viscosity between the lower limit and upper limit described above allows easy formation of a dropping portion 5b with a tapered and continuous shape below the conductor 2 as shown in FIGS. 11A and 11B when the exposed portion 10 is immersed in, and pulled up from the liquid of the water-stopping agent 5 in the step of forming the water-stopping portion 4. The easier the formation of such a tapered dropping portion 5b increases, as described later, the advantageous effect of forming the water-stopping portion 4 with high outer-diameter uniformity in the longitudinal axis direction is improved by going through execution of the pulling-up step, and then the retightening step in this order in the insulated electric wire production method according to the embodiment of the present disclosure.

Also, the water-stopping agent 5 preferably has an elastic constant higher than that of the insulation covering 3 in a state after curing. The feature that the water-stopping agent 5 has a high elastic constant means that the water-stopping agent 5 is hard and is unlikely to experience a mechanical deformation. Accordingly, if the water-stopping agent 5 has an elastic constant higher than that of the insulation covering 3, when a mechanical load is applied to the insulated electric wire 1, the load is unlikely to reach the water-stopping portion 4, and the water-stopping performance of the water-stopping portion 4 is likely to be maintained. For example, when the insulated electric wire 1 is bent near the water-stopping portion 4, a bent portion is not likely to be formed in the water-stopping portion 4, but be formed at a covered portion 20 which is not covered with the water-stopping agent 5. Here, the elastic constants of the water-stopping agent 5 and the insulation covering 3 can be evaluated as bend elastic constants, and can be measured by bending tests according to JIS K 7171: 2016, for example.

Further preferably, the elastic constant of the water-stopping agent 5 is at least 120% of the elastic constant of the insulation covering. A specific elastic constant of the water-stopping agent 5 is not particularly limited, but preferably at least 200 MPa, and more preferably at least 220 MPa when measured as a bend elastic constant at room temperature.

As the hardness of the water-stopping agent 5 increases, the easiness of reducing the influence of a mechanical load on the water-stopping performance increases. Accordingly, there is no particular upper limit of the elastic constant of the water-stopping agent 5. However, if the water-stopping agent 5 is too hard, the easiness of handling of the insulation covering 3 as a whole in routing or the like with bending lowers, and additionally damage such as a crack or a breakage rather may be likely to be generated at the interface with the insulation covering 3 or at a portion near the interface. Accordingly, it is preferable that the elastic constant of the water-stopping agent 5 is kept at not greater than twice of the elastic constant of the insulation covering 3. Further, it is preferable that the elastic constant of the water-stopping agent 5 is kept at approximately not greater than 300 MPa when measured as a bend elastic constant at room temperature.

Structure of Water-Stopping Portion

Here, the structure of the water-stopping portion 4 is described by listing preferred aspects.

(1) Outline Shape and Thickness of Outer Circumferential Area

First, with reference to FIGS. 2 and 3, preferred aspects of the outline shape of the water-stopping portion 4 as a whole, and the thickness of the layer of the water-stopping agent 5 in the exposed-portion-outer-circumferential area 42 and the covered-portion-outer-circumferential areas 43 are described.

Ideally, as shown in FIG. 2, the water-stopping portion of the insulated electric wire 1 according to the present embodiment preferably does not have an inclined structure or an irregular structure on its outer circumferential surface, but has a straight structure. However, it is difficult to form a straight water-stopping portion 4 in such a manner where the water-stopping portion 4 is actually formed. In many cases, as shown in FIG. 3 in an exaggerated manner, an irregular structure is formed on the surface of the water-stopping portion 4, and a non-uniform distribution is generated in the outer diameter of the water-stopping portion 4. In the insulated electric wire 1 according to the present embodiment, a rate of difference defined as the ratio of the difference $\Delta D$ ($=D1-D2$) between a maximum outer diameter D1 which is the maximum value of the outer diameter in a subject region R which is defined as a region of the exposed-portion-outer-circumferential area 42 of the water-stopping portion 4 other than both end portions, and a minimum outer diameter D2 which is the minimum value of the outer diameter in the subject region R to the minimum outer diameter D2 is made not greater than 12% ($\Delta D/D2 \leq 0.12$).

Here, the subject region R means a region that is a part of the exposed-portion-outer-circumferential area 42 other a closer to the covered-portion-outer-circumferential areas 43 which has an increased outer diameter due to the thickness of the insulation covering 3. That is, since the outer circumference of the insulation covering 3 is covered with the water-stopping agent 5 in the covered-portion-outer-circumferential areas 43, the outer diameter of the water-stopping portion 4 is larger than that in the exposed-portion-outer-circumferential area 42 in which the outer circumference of only the conductor 2 is covered with the water-stopping agent 5, and, due to the continuity of the areas and 43 with the different outer diameters, outer diameters in regions of end portions of the exposed-portion-outer-circumferential area 42 adjacent to the covered-portion-outer-circumferential areas 43 are larger than those in other regions, in many cases. In this manner, a region of the exposed-portion-outer-circumferential area 42 other than portions with larger outer diameters due to the influence of the covered-portion-outer-circumferential areas 43 is treated as the subject of consideration as the subject region R. The lengths of regions of the exposed-portion-outer-circumferential area 42 closer to the covered-portion-outer-circumferential areas 43 which have larger outer diameters due to the thickness of the insulation covering 3 and excluded from the subject region R are approximately at least 10% and not greater than 40% of the entire length of the exposed-portion-outer-circumferential area 42. Also, generally, at end edges of the covered portions 20 closer to the exposed portion 10, regions in which a radial position of the surface of the water-stopping portion 4 is located outside a radial position covered by the insulation covering 3 only need to be excluded from the subject region R at both ends of the exposed portion covered area 42. If the covered-portion-outer-circumferential areas 43 are present on each side of the exposed-portion-outer-circumferential area 42 as in the shown configuration, the subject region R is set by excluding, from each side of the exposed-portion-outer-circumferential area 42, portions that are influenced by the presence of the covered-portion-outer-circumferential areas 43, such as portions that occupy 10 to 40% on each side of the entire length of the exposed-portion-outer-circumferential area 42. Note that the outer diameter of the water-stopping portion 4 means the length of the longest straight line in straight lines crossing the cross section of a portion of interest (the same applies also in the following description).

In the water-stopping portion 4 of the insulated electric wire 1 according to the present embodiment, the rate of difference $\Delta D/D2$ in the subject region R of the exposed-portion-outer-circumferential area 42 is not greater than 12%. This functions as an indicator that, in the exposed-portion-outer-circumferential area 42, the non-uniform distribution of the outer diameter is small, and the surface is less irregular. That is, it means that the shape of the exposed-portion-outer-circumferential area 42 is closer to a straight shape as shown in FIG. 2. In this manner, the feature that the non-uniform distribution of the outer diameter is small in the exposed-portion-outer-circumferential area 42 means that the non-uniformity of the thickness of the layer of the water-stopping agent 5 in the exposed-portion-outer-circumferential area 42 is small, and makes it likely for the entire exposed-portion-outer-circumferential area 42 to sufficiently exhibit a material strength that the constituent material of the water-stopping agent 5 has by nature. If there is significant non-uniformity of the thickness of the layer of the water-stopping agent 5, when the insulated electric wire 1 is bent at the water-stopping portion 4, a mechanical load is undesirably concentrated at portions with smaller outer diameters including a portion where the layer of the water-stopping agent 5 is thin, that is, a portion forming the minimum outer diameter D2. This makes it difficult to bend the insulated electric wire 1. Additionally, damage such as a breakage or a crack is caused to the layer of the water-stopping agent 5 at the portions where the mechanical load is concentrated, and the water-stopping performance may be reduced undesirably. However, if, in the exposed-portion-outer-circumferential area 42, the rate of difference $\Delta D/D2$ is maintained at not greater than 12% and outer-diameter non-uniformity is decreased, a situation where a mechanical load due to bending or the like is concentrated at a particular portion can be avoided. As a result, it becomes easier to execute uniform bending, and occurrence of damage accompanying the bending, and a reduction in the water-stopping performance are unlikely to occur. The rate of difference $\Delta D/D2$ which is not greater than 10%, and furthermore which is not greater than 6% makes those effects particularly advantageous. The water-stopping portion 4 with the rate of difference $\Delta D/D2$ in the exposed-portion-outer-circumferential area 42 that is kept small can be suitably produced by going through steps of immersing a region including the exposed portion 10 in the liquid of the water-stopping agent 5, pulling up the region from the liquid, and tightening the twist of the conductor 2 in the exposed portion 10, as described in detail as an insulated electric wire production method according to the embodiment of the present disclosure later.

In view of avoiding concentration of a load due to an external force at a particular portion in the exposed-portion-outer-circumferential area 42 and securing a superior water-stopping performance, a particular upper limit is not provided for the rate of difference $\Delta D/D2$, and a preferable rate of difference $\Delta D/D2$ is one which is as small as possible. That is, as shown in FIG. 2, it is the most preferable if the exposed-portion-outer-circumferential area 42 has an ideal cylindrical shape. However, it is very difficult to form the water-stopping portion 4 in such an ideal shape when the water-stopping portion 4 is formed in an actual insulated electric wire 1. The rate of difference $\Delta D/D2$ which is approximately at least 1%, and furthermore at least 3% allows formation of the water-stopping portion 4 without having to make excessive efforts, and allows an effective decrease of the influence of an external force.

Portions with smaller outer diameters such as a portion forming the minimum outer diameter D2 in the water-stopping portion are easily formed at the central portion (and portions near the central portion; the same applies also in the following description) of the exposed-portion-outer-circumferential area 42. A reason for this is as follows. As adopted also in the production method described later, when the water-stopping portion 4 is formed, in a state in which the liquid water-stopping agent 5 is placed in a region including the exposed portion 10 in steps including steps of immersing the region including the exposed portion 10 in the liquid of the water-stopping agent 5, and then pulling up the region from the liquid of the water-stopping agent 5, dropping of the water-stopping agent 5 tends to occur, but the dropping significantly tends to occur at the central portion of the exposed portion 10 (see FIGS. 11A and 11B). This reduces the amount of the water-stopping agent 5 that stays on the outer circumference of the exposed portion 10 at the central portion of the exposed portion to be the exposed-portion-outer-circumferential area 42 due to the dropping. As a result, the layer of the water-stopping agent becomes thin as compared with end portions at the central portion of the exposed-portion-outer-circumferential area 42, and the outer diameter decreases. If the outer diameter decreases at the central portion of the exposed-portion-outer-circumferential area 42 in this manner, the rate of difference $\Delta D/D2$ tends to be increased.

In view of avoiding an increase of the rate of difference $\Delta D/D2$ due to a diameter-reduction of the central portion of the exposed-portion-outer-circumferential area 42 in this manner, in the insulated electric wire 1 according to the present embodiment, the maximum outer diameter D1 is preferably obtained in either of central regions R2 and R3 in four regions R1 to R4 obtained by equally dividing the subject region R into four in the longitudinal axis direction. This means that the central portion bulges as compared with both end portions of the subject region R. Further, it is preferable that the minimum outer diameter D2 is obtained in either of the regions R1 and R4 on both sides. As a method of increasing the outer diameters of the central regions R2 and R3 in the water-stopping portion 4, maintaining the outer diameters, and placing a portion forming the maximum outer diameter D1 at those regions R2 and R3, as described in detail later, a method in which an operation of immersing the exposed portion 10 in the liquid of the water-stopping agent 5, pulling up the exposed portion 10, and then tightening the twist of the conductor 2 at the exposed portion in this order can be adopted suitably. Furthermore, by performing an operation of rotating, around its axis, the insulated electric wire 1 having been pulled up from the water-stopping agent 5, and winding the dropping water-stopping agent 5 around the outer circumference of the insulated electric wire 1, the outer diameter of the central portion of the exposed-portion-outer-circumferential area 42 can be increased easily. Furthermore, it is preferable that the maximum outer diameter D1 is obtained in the central region in three regions obtained by equally dividing the exposed-portion-outer-circumferential area 42 into three, and also the maximum outer diameter D2 is obtained in either of the side regions. Also, instead of the feature that the position forming the maximum outer diameter D1 is present in either of the two central regions R2 and R3 in the regions obtained by equally dividing the subject region R into four or in the central region in the three regions formed by equally dividing the subject region R into three or in addition to this feature, the feature that the average of outer diameters of the two central regions R2 and R3 in the regions formed by equally dividing the subject region R into four or the central region in the regions formed by equally dividing the subject region R into three is greater than the average of outer diameters of the regions on both sides (the regions R1 and R4 if the subject region R is equally divided into four) may be used as an indicator that the central portion of the water-stopping portion 4 bulges.

Furthermore, as another indicator for avoiding an increase the rate of difference ΔD/D2 due to a diameter-reduction of the central portion of the exposed-portion-outer-circumferential area 42, it is preferable that the water-stopping portion 4 does not have a portion with an outer diameter smaller than the outer diameters of portions of the covered portions 20 of the insulated electric wire 1 which do not have the water-stopping portion 4 placed thereon (the outer diameter of the insulated electric wire 1 itself) Since the water-stopping portion 4 is formed as a portion including the outer circumferential areas of end portions of the covered portions 20, if the water-stopping portion 4 has a straight shape, outer diameters of the entire water-stopping portion 4 should be greater than the outer diameters of the portions of the covered portions 20 which do not have the water-stopping portion 4 placed thereon. However, if the outer diameter of the water-stopping portion 4 at a portion forming the minimum outer diameter D2 is smaller than the outer diameters of the covered portions 20, then the water-stopping portion 4 does not have a straight shape and significant non-uniformity is caused in the outer diameter. Accordingly, it is a good indicator that the water-stopping portion has high outer-diameter uniformity of the entire water-stopping portion 4 if there is shown the feature that the water-stopping portion 4 does not have a portion with an outer diameter smaller than the outer diameters of portions of the covered portions 20 which do not have the water-stopping portion 4 placed thereon.

As mentioned above, by reducing the rate of difference ΔD/D2 in the exposed-portion-outer-circumferential area 42 of the water-stopping portion 4, and increasing the outer diameters in the central regions R2 and R3, the advantageous effect of decreasing the influence of a mechanical load and maintaining high water-stopping performance is more significant if the long exposed portion 10 is covered with the water-stopping portion 4 and the exposed-portion-outer-circumferential area 42 is formed. For example, the length of the exposed portion 10 in the longitudinal axis direction is preferably more than three times, and further preferably more than 5 times of the outer diameter of the conductor at the exposed portion 10.

Furthermore, as shown in FIG. 2, in the water-stopping portion 4 of the insulated electric wire 1 according to the present embodiment, it is preferable that a thickness La of the layer of the water-stopping agent 5 in the exposed-portion-outer-circumferential area 42 is greater than a thickness Lb of the layer of the water-stopping agent 5 in the covered-portion-outer-circumferential areas 43 (La>Lb). As the thickness of the layer of the water-stopping agent 5 increases, the material strength exhibited by the layer of the water-stopping agent 5 increases, and accordingly this makes it unlikely for a mechanical load such as a bending load to be applied to the water-stopping portion 4, and also the influence can be minimized even if a mechanical load is applied. Therefore, the feature that the thickness of the layer of the water-stopping agent 5 is greater in the exposed-portion-outer-circumferential area 42 than in the covered-portion-outer-circumferential areas 43 makes it unlikely for the water-stopping performance of the water-stopping portion to be influenced by a mechanical load at the portion of the exposed portion 10. For example, when the water-stopping portion 4 or a region near the water-stopping portion 4 is bent, it becomes unlikely for a bent portion to be formed at the portion of the water-stopping portion 4 corresponding to the exposed portion 10. Note that if the thicknesses La and Lb of the layer of the water-stopping agent 5 in the exposed-portion-outer-circumferential area 42 and the covered-portion-outer-circumferential areas 43 have distributions in the longitudinal axis direction, their respective averages only need to satisfy the predetermined relationship. The same applies also in the following description.

As result of satisfying the relationship, La>Lb, damage such as a crack due to a load caused by bending is unlikely to be caused to the water-stopping agent 5 constituting the inter-elemental-wire filling area 41 and the exposed-portion-outer-circumferential area 42, and this brings about an advantageous effect of maintaining a superior water-stopping performance. In a region of the water-stopping portion 4 that corresponds to the covered portion 20, even if the region is bent and the water-stopping agent 5 is damaged, it is likely that the water-stopping performance of the water-stopping portion 4 is not to be significantly affected. However, if in the portion of the exposed portion 10 of the water-stopping portion is bent and the water-stopping agent 5 constituting the inter-elemental-wire filling area 41 or the exposed-portion-outer-circumferential area 42 is damaged, it becomes difficult to sufficiently prevent entry of water into the gaps between the elemental wires 2a, and the water-stopping performance of the water-stopping portion 4 is likely to be significantly influenced. Accordingly, by making the thickness of the layer of the water-stopping agent 5 greater in the exposed-portion-outer-circumferential area 42 than in the covered-portion-outer-circumferential areas 43, the portion of the exposed portion 10 where the influence of a mechanical load such as a bending load on the water-stopping performance becomes severer can be preferentially protected from application of a mechanical load. More preferably, the thickness La of the layer of the water-stopping agent 5 in the exposed-portion-outer-circumferential area 42 is more than 1.5 times of the thickness Lb of the layer of the water-stopping agent in the covered-portion-outer-circumferential areas 43.

Further, it is preferable that the thickness Lb of the layer of the water-stopping agent 5 in the covered-portion-outer-circumferential areas 43 is smaller than a thickness Lc of the insulation covering 3 (Lb<Lc). As the thickness of the layer of the water-stopping agent 5 decreases, the easiness of bending of the insulated electric wire 1 at that portion increases. Accordingly, in the covered-portion-outer-circumferential area 43, the layer of the water-stopping agent 5 provided on the outer circumference of the insulation covering 3 is formed to be thinner than the layer of the insulation covering 3. This makes it easier for the water-stopping portion 4 to be bent in the region of the covered portion 20 because the layer of the water-stopping agent 5 is less likely to interfere with the flexibility of the insulation covering 3. As described above, in combination with the advantageous effect attained by the feature that the thickness of the layer of the water-stopping agent 5 is greater in the exposed-portion-outer-circumferential area 42 than in the covered-portion-outer-circumferential areas 43 (La>Lb), it becomes easier for the water-stopping portion 4 to be bent not at the exposed portion 10, but in the region of a covered portion 20 when the insulated electric wire 1 is bent at a portion of the water-stopping portion 4. By absorbing bending of the water-stopping portion 4 in the covered-portion-outer-circumferential area 43, and making it unlikely for the inter-elemental-wire filling area 41 or the exposed-portion-outer-circumferential area 42 to be bent in this manner, it becomes easier to avoid a situation where damage such as a crack due to bending is caused to the water-stopping agent of the inter-elemental-wire filling area 41 or the exposed-portion-outer-circumferential area 42 that has a particularly important function of water stopping of the conductor 2, and it becomes impossible to maintain a sufficiently water-stopping performance. Further it is preferable that the thickness Lb of the layer of the water-stopping agent 5 in the covered-portion-outer-circumferential areas 43 is not greater than 80% of the thickness Le of the insulation covering 3.

As an overall shape of the water-stopping portion 4, preferably, the water-stopping portion 4 has taper portions 44 on its both end portions in the longitudinal axis direction. That is, it is preferable that the water-stopping portion 4 has, at end portions of the covered-portion-outer-circumferential areas 43 corresponding to end portions of the whole, taper structures in which the thickness of the layer of the water-stopping agent 5 decreases in thickness outward the outer side in the longitudinal axis direction (in the directions away from the exposed portion 10). Formation of such taper portions 44 makes it easier for the water-stopping agent 5 constituting the water-stopping portion 4 to rigidly adhere to the outer circumferential surface of the insulation covering 3. This makes it easier to maintain the state in which the water-stopping portion 4 exhibits a superior water-sopping performance. Particularly, even when a mechanical load such as a bending load is applied to the insulated electric wire 1 at the water-stopping portion 4 or a portion near the water-stopping portion 4, the presence of the taper portions 44 makes it unlikely for the stress to be concentrated at an end portion of the water-stopping portion 4, and makes it unlikely for the layers of the covered-portion-outer-circumferential areas 43 to be peeled off from the surface of the insulation covering 3. As a result, it is possible to reduce a reduction in the water-stopping performance due to the influence of a load.

Furthermore, it is preferable that the water-stopping portion 4 has a straight shape in the longitudinal axis direction, that is, an outer surface shape that can be approximated to a cylinder, except in partial regions of the end portions in the longitudinal axis direction such as the taper portions 44. This means, as described above, that in addition to the feature that the thickness distribution of the layer of the water-stopping agent in the exposed-portion-outer-circumferential area 42 is small as indicated by, as an indicator, the feature that the rate of difference $\Delta D/D2$ in the subject region R is small, the water-stopping portion 4 as a whole including up to the covered-portion-outer-circumferential areas 43 has a small thickness distribution of the layer of the water-stopping agent 5, and the water-stopping portion 4 as a whole has a straight shape. The feature that the water-stopping portion 4 has a straight shape makes it easier to avoid a situation where a mechanical load is concentrated at a particular portion of the water-stopping portion 4, and damage such as a crack worsens at the portion. This makes it easier to maintain the superior water-stopping performance of the water-stopping portion 4 as a whole. As an indicator that the water-stopping portion 4 has a straight shape, for example, preferably, a structure having a difference in height equal to or greater than the thickness Lb of the layer of the water-stopping agent 5 in the covered-portion-outer-circumferential area 43 is not formed on the outer circumferential surface of the water-stopping portion 4. Examples of a structure having a difference in height on the outer circumferential surface of the water-stopping portion 4 include an irregular structure or an inclined surface structure. It becomes easier to avoid concentrated application of a mechanical load if none of those structures are formed, or the difference in height is kept small. It is preferable that there is no difference in height equal to or greater than 20% of the thickness Lb of the layer of the water-stopping agent 5 in the covered-portion-outer-circumferential area 43. The difference in height of the outer circumferential surface of the water-stopping portion 4 can be associated with a difference in height of outer diameters of the water-stopping portion 4, and instead of the difference itself, may be evaluated on the basis of the distribution of outer diameters of the water-stopping portion 4. That is, as the distribution of the outer diameters of the water-stopping portion 4, preferably, a distribution having a difference equal to or greater than the thickness Lb of the layer of the water-stopping agent 5 in the covered-portion-outer-circumferential area 43 is not formed, and furthermore a distribution having a difference equal to or greater than 20% of the thickness Lb is not formed.

(2) State of Conductor in Water-Stopping Portion

Next, a preferred aspect of the conductor 2 surrounded by the water-stopping agent 5 in the water-stopping portion 4 is described. As described above, in the water-stopping portion 4 of the insulated electric wire 1 according to the present embodiment, the water-stopping agent 5 permeates, and becomes cured between the elemental wires 2a of the conductor 2 exposed as the exposed portion 10. There are no problems even if the state of the conductor constituting the exposed portion 10 is the same as the state of the conductor 2 at the covered portions 20 covered with the insulation covering 3, but, if it has a different state, this is advantageous in view of causing the water-stopping agent 5 to permeate the gaps between the elemental wires 2a, and to be held therebetween.

First, in the insulated electric wire 1, preferably, the density of the metal material per unit length (per unit length of the insulated electric wire 1 in the longitudinal axis) is not uniform and has a nonuniform distribution. Note that each of the elemental wires 2a is defined as a wire having a substantially uniform diameter continuously along the entire longitudinal axis of the insulated electric wire 1. In the present specification, the state where the density of the metal material per unit length is different between areas is defined as a state where the diameter and the number of the elemental wires 2a are constant, but the state of assembly of the elemental wires 2a such as the state of twist of the elemental wires 2a is different.

Specifically, it is preferable that the density of the metal material of the conductor 2 per unit length be higher in the exposed portion 10 than in the covered portions 20. However, the density of the metal material per unit length may be partially lower in adjacent areas 21 of the covered portions 20 that are immediately adjacent to the exposed portion 10 than in the exposed portion 10. In other words, the density of the metal material per unit length is higher in the exposed portion 10 than at least in remote areas of the covered portions 20 other than adjacent areas 21. In the remote areas 22, the state of the conductor 2 such as the density of the metal material per unit length is substantially equal to the state of the insulated electric wire 1 in which no water-stopping portion 4 is formed. Note that possible reasons why the density of the metal material can be reduced in the adjacent areas 21 include that the metal material is shifted to the exposed portion 10, and that the conductor 2 is deformed to ensure the continuation between the exposed portion 10 and the covered portions 20.

Figure 10:
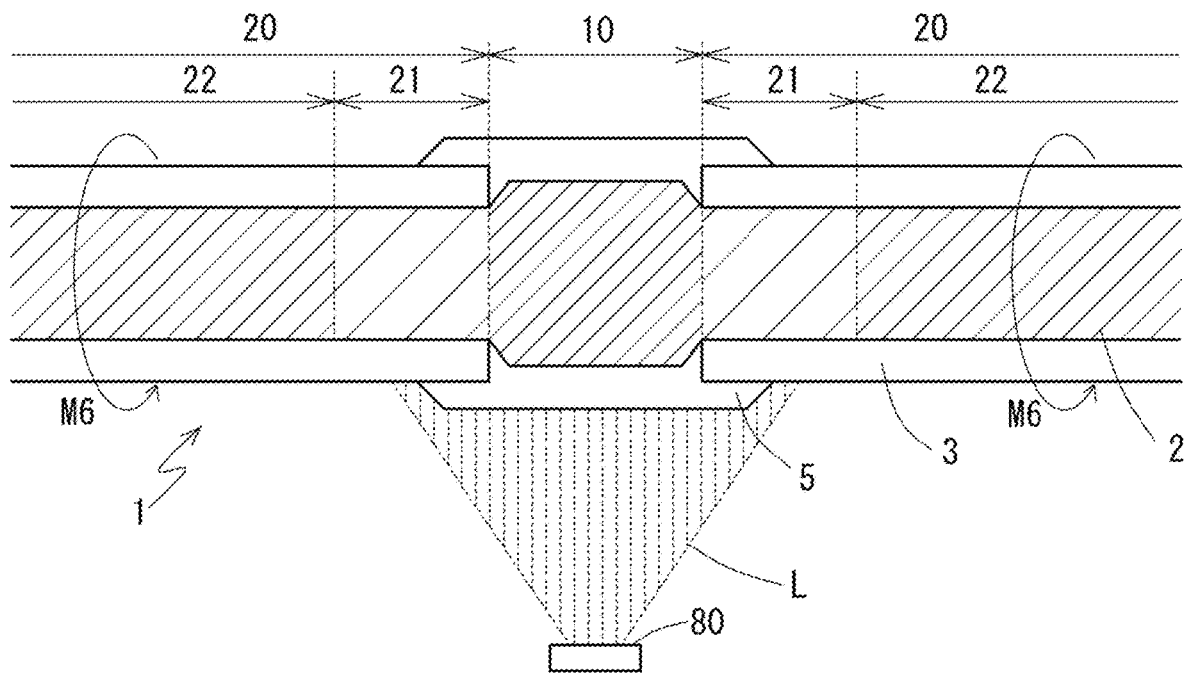
FIG. 10 illustrates a curing step which is a step for producing the insulated electric wire.

FIG. 10 schematically illustrates a state of the conductor having the density distribution of the metal material as described above. In FIGS. 7 to 10, the area inside the conductor 2 is hatched, and the higher the density of hatching is, the smaller the twist pitch of the elemental wires 2a is, that is, the smaller the distances between the elemental wires 2a are. Further, the larger the width (vertical length) of the area representing the conductor is, the larger the diameter of the conductor 2 is. Those parameters in the drawings only schematically show the relative relationship of the sizes between the areas, and are not proportional to the twist pitch of the elemental wires 2a or the diameter of the conductor. Furthermore, the parameters in the drawings are discontinuous between different regions, but in the actual insulated electric wire 1, the state of the conductor 2 changes continuously between these regions.

In the exposed portion 10, by increasing the density of the metal material per unit length as well as the actual length of the elemental wires 2a included per unit length, it is possible to realize a state in which the elemental wires 2a are loosened, the distances between the elemental wires 2a are increased, and large gaps between the elemental wires 2a are secured, and thus the water-stopping agent 5 can permeate the gaps between the elemental wires 2a in this state, as will be described in detail later as a method for producing the insulated electric wire 1. As a result, the water-stopping agent 5 is more likely to permeate the gaps between the elemental wires 2a, and thus every part of the exposed portion 10 can be filled with the water-stopping agent easily and highly uniformly. FIG. 10 shows a state where the conductor 2 has a larger diameter in the exposed portion 10 than in the remote areas 22 of the covered portions 20 so that it is easy to notice the change in density of the metal material. However, the conductor diameter of the exposed portion 10 does not need to be wide as such, and in view of miniaturization of the water-stopping portion 4, as shown in FIG. 2, it is preferable that the conductor diameter of the exposed portion 10 be as large as the conductor diameter of the covered portions 20.

Furthermore, it is preferable that the twist pitch of the elemental wires 2a be smaller in the exposed portion 10 than the twist pitch in the remote areas 22 of the covered portions 20, in addition to the density of the metal material per unit length that is higher in the exposed portion 10 than in the remote areas 22 of the covered portions 20. This is because the fact that the twist pitch of the elemental wires 2a is smaller in the exposed portion and the distances between the elemental wires 2a are smaller in the exposed portion 10 also brings about an effect of improving the water-stopping performance. That is to say, if the distances between the elemental wires 2a are reduced during formation of the water-stopping portion 4 in which the gaps between the elemental wires 2a are filled with the water-stopping agent 5 in a liquid state, the water-stopping agent 5 is likely to stay in the gaps between the elemental wires 2a uniformly without dropping or flowing. If the water-stopping agent 5 is cured from this state, a superior water-stopping performance can be obtained in the exposed portion 10. Also, as a result of the twist pitch being smaller in the exposed portion 10 than in the remote areas 22, it is possible to suppress the conductor diameter in the exposed portion 10 so that it is not too large compared to the conductor diameter of the remote areas 22, even if the density of the metal material per unit length is higher in the exposed portion 10 than in the remote areas 22. Accordingly, the outer diameter of the entire water-stopping portion 4 can be made substantially the same as the outer diameter of the insulated electric wire 1 in the remote areas 22, or can be suppressed so as not to be much larger than that in the remote areas 22.

(3) State of Cross Section of Water-Stopping Portion at Exposed Portion

Next, a preferred aspect of a cross-sectional structure of the region that is a part of the water-stopping portion 4 and corresponds to the exposed portion 10 is described. As described above, in the water-stopping portion 4 of the insulated electric wire 1 according to the present embodiment, the inter-elemental-wire filled area 41 where the water-stopping agent is placed is formed in the gaps between the elemental wires 2a constituting the conductor 2 of the exposed portion 10, and also the exposed-portion-outer-circumferential area 42 in which the outer circumference of the conductor 2 is covered with the water-stopping agent 5 is formed. This allows the exposed portion to exhibit a superior water-stopping performance, and, by controlling the state of the cross section of the water-stopping portion 4 at the exposed portion 10, it becomes possible to further improve the water-stopping performance. A preferable state of the cross section of the water-stopping portion 4 at the exposed portion is described below.

As shown in FIG. 4, it is preferable that, in an area enclosed by a surface 5a of the water-stopping agent 5 in the water-stopping portion 4 of the insulated electric wire 1, the surface of elemental wires 2a is in contact with the water-stopping agent 5 or other elemental wires 2a. In other words, it is preferable that the surface of each elemental wire 2a included in the conductor 2 is in contact with the water-stopping agent 5 or another elemental wire 2a adjacent to that elemental wire 2a, and is not in contact with any substance other than the water-stopping agent 5 and the constituent material of the elemental wires 2a, such as bubbles B in which a defect of the water-stopping agent is filled with air, and liquid bubbles formed as a result of a liquid such as water entering the bubble B. Preferably, the water-stopping agent 5 densely fills up the gaps between the elemental wires 2a and adheres to the surface of the elemental wires 2a without the interposition of any bubble B or the like.

This configuration prevents water from entering the area between the elemental wires 2a through the bubble B from outside the water-stopping portion 4, or the bubble B from causing damage, when an external force is applied, that can be a pathway for water to enter. In the water-stopping portion 4, it becomes possible for the water-stopping agent 5 adhering to the surfaces of the elemental wires 2a to particularly effectively prevent entry of water into an area between the elemental wires 2a. It is also possible to effectively prevent water that has entered an area between the elemental wires 2a in one portion of the insulated electric wire such as an electric wire terminal from moving to another portion of the insulated electric wire 1 such as the covered portion 20 along the elemental wires 2a. By eliminating the bubble B in contact with the elemental wires 2a in this manner, in combination with the advantageous effect that the rate of difference ΔD/D2 is kept at not greater than 12%, it becomes easier to reduce a reduction in the water-stopping performance due to application of a mechanical load.

Here, the surface of an elemental wire 2a may be in contact with the water-stopping agent 5 or another elemental wire 2a, but a better water-stopping performance can be realized when the surface is in contact only with the water-stopping agent 5, because by directly adhering to the elemental wire 2a, the water-stopping agent particularly effectively prevents this elemental wire 2a from coming into contact with water. However, also when the surface of an elemental wire 2a is in contact with another elemental wire 2a, water cannot enter a contact interface between the two adjacent elemental wires 2a that are in contact with each other, and a sufficiently good water-stopping performance can be ensured. Due to the absence of bubbles B that are in contact with the elemental wires 2a, the positional relationship between the adjacent elemental wires 2a hardly changes, and a state in which water cannot enter the contact interface between the adjacent elemental wires 2a is maintained.

The cross section of the water-stopping portion 4 may include bubbles B that are not in contact with any elemental wire 2a but are surrounded over their entire circumference by the water-stopping agent 5, rather than bubbles B that are in contact with an elemental wire 2a. Ideally, it is preferable that no kind of bubble B is included in the area enclosed by the surface 5a of the water-stopping agent 5, but even if there is a bubble B, this will not significantly reduce the water-stopping performance of the water-stopping portion 4 as long as the bubble B is not in contact with an elemental wire 2a. For example, there may be bubbles B whose entire circumference is surrounded by the water-stopping agent 5 on the outer side of the area constituted by the conductor 2. Also, in the configuration shown in FIG. 4, there is such a bubble B whose entire circumference is surrounded by the water-stopping agent 5 on the outer side of the conductor 2.

Note that, as described above, bubbles B that are in contact with an elemental wire 2a are a cause of a reduction in the water-stopping performance, but if, for example, the required level of water-stopping performance is low, the water-stopping performance and the water-preventing performance of the insulated electric wire 1 may not be influenced significantly despite the presence of bubbles B that are in contact with an elemental wire 2a, as long as the amount or the size of such bubbles B is small. For example, in a cross section of the water-stopping portion 4, it is preferable that the sum of the cross-sectional areas of bubbles B that are in contact with the elemental wires 2a be not more than 5% of the sum of the cross-sectional areas of the elemental wires 2a. It is also preferable that the cross-sectional area of each bubble B that is in contact with an elemental wire 2a be not more than 80% of the cross-sectional area of one elemental wire 2a. On the other hand, even bubbles B whose entire circumference is surrounded by the water-stopping agent 5 and that are not in contact with an elemental wire 2a may affect the water-stopping performance of the water-stopping portion 4, if they are located close to the elemental wire 2a. Accordingly, it is preferable that a bubble B and an elemental wire 2a be provided at a distance of at least 30% of the diameter of the elemental wire 2a, and the space therebetween be filled with the water-stopping agent 5.

Furthermore, it is preferable that, in a cross section of the water-stopping portion 4, the elemental wires 2a located in the outer circumferential portion of the conductor 2 have a more flattened shape than the elemental wires 2a located inward thereof. Also in FIG. 4, elemental wires 2a1 located in the outer circumferential portion of the conductor 2 have a flattened and substantially ellipsoidal cross-section. Elemental wires 2a2 located inward of the elemental wires 2a1, which are located in the outer circumferential portion of the conductor 2, have a less flattened cross-section. Note that the cross section perpendicular to the axial direction of each elemental wire 2a itself is approximately circular, and a flattened cross-sectional shape in the water-stopping portion 4 is generated not by the cross-sectional shape of the elemental wire 2a itself, but by the placement of the elemental wires 2a in the conductor 2 as described below.

If the elemental wires 2a constituting the conductor 2 are twisted in a gentle spiral shape with a relatively small inclination angle, the axial direction of the elemental wires 2a is oriented in a direction close to the longitudinal axis direction of the insulated electric wire 1, and thus a cross section of the elemental wire 2a taken perpendicular to the longitudinal axis direction of the insulated electric wire 1 has a shape that is substantially circular and is less flattened. By contrast, if the elemental wires 2a constituting the conductor 2 are twisted in a steep spiral shape with a relatively large inclination angle, the axial direction of the elemental wires 2a is oriented in a direction largely inclined with respect to the longitudinal axis direction of the insulated electric wire 1, and thus if an elemental wire 2a is cut perpendicular to the longitudinal axis direction of the insulated electric wire 1, the elemental wire 2a will be cut at an angle with respect to the axis direction of the elemental wire 2a. Accordingly, the cross section of the elemental wire 2a has a flattened shape that can be approximated to an ellipse. Thus, the above description of the elemental wires 2a1 located in the outer circumferential portion of the conductor 2 in the cross section of the water-stopping portion 4 having a more flattened shape than the elemental wires 2a2 located inward thereof means that the elemental wires 2a1 located in the outer circumferential portion of the conductor 2 are twisted in a steep spiral shape with a large inclination angle, compared to the spiral shape of the inner elemental wires 2a2.

As described above, the water-stopping portion 4 can be formed by filling the areas between the elemental wires 2a with the water-stopping agent 5 in a high flowability state, and then decreasing the flowability, and by twisting the elemental wires 2a1 located in the outer circumferential portion of the conductor in a steep spiral state with a large inclination angle with the areas between the elemental wires 2*a* filled with the water-stopping agent 5 in a high flowability state, the water-stopping agent 5 filling up the areas is unlikely to drop or flow to the outside of the conductor 2, and stay in the areas between the elemental wires 2*a* with high uniformity. As a result, the areas between the elemental wires 2*a* are filled with a sufficient amount of water-stopping agent 5, and a water-stopping portion 4 having a superior water-stopping performance is easily formed.

Specifically, when, as will be described later as a method for producing the insulated electric wire 1, a production method is used in which the distances between the elemental wires 2*a* in the exposed portion 10 are increased while unwinding the elemental wires 2*a* from the covered portion 20 to the exposed portion 10, and in this state, the gaps between the elemental wires 2*a* are filled with the water-stopping agent 5, and after the filling step, the distances between the elemental wires 2*a* in the exposed portion are reduced (retightening step), the cross-sectional shape of the elemental wires 2*al* in the outer circumferential portion of the conductor 2 is likely to be flattened, and it is thus advantageous in that the water-stopping agent 5 is easily held in the gaps between the elemental wires 2*a*. Thus, the feature of the elemental wires 2*al* in the outer circumferential portion of the conductor 2 having a flattened cross-sectional shape is an indicator used when a water-stopping portion 4 having a superior water-stopping performance is formed.

An ellipticity can be used as a specific indicator for evaluating the level of flatness of the cross-sectional shape of the elemental wires 2*a*. The ellipticity is obtained by dividing the length of the short axis (short diameter) of a cross-sectional shape by the length of the long axis (long diameter), i.e. (short diameter/long diameter). The smaller the value of the ellipticity is, the more flattened the cross-sectional shape is. In a cross section of the water-stopping portion 4, the ellipticity of the elemental wires 2*al* located in the outer circumferential portion of the conductor 2 preferably has a value less than the value of the ellipticity of the elemental wires 2*a*2 located inward thereof. Furthermore, the ellipticity of the elemental wires 2*al* located in the outer circumferential portion of the conductor 2 is preferably not greater than 0.95. This brings about an effect of configuring the water-stopping portion 4 in which a sufficient amount of water-stopping agent 5 is held between the elemental wires 2*a*, and has a superior water-stopping performance. On the other hand, the ellipticity of the elemental wires 2*al* located in the outer circumferential portion of the conductor 2 is preferably at least 0.50. This makes it possible to suppress a difference in the actual length between the elemental wires 2*al* located in the outer circumferential portion of the conductor 2 and the elemental wires 2*a*2 located inward thereof within a range in which the above-described effect of improving the water-stopping performance is not saturated.

It is preferable that in a cross section of the water-stopping portion 4, the ellipticity of the elemental wires 2*al* located in the outer circumferential portion of the conductor be smaller than the ellipticity of the elemental wires 2*a*2 located inward thereof, and the ellipticities of the elemental wires 2*al* and 2*a*2 in a cross section of the water-stopping portion 4, particularly, the ellipticity of the elemental wires 2*al* located in the outer circumferential portion be smaller than the values of the ellipticities of the elemental wires 2*a* in a cross section of the covered portion 20 (specifically, a later-described remote area 22) that is taken perpendicular to the longitudinal axis direction of the insulated electric wire 1. This means that the twist pitch of the elemental wires 2*a* is smaller in the exposed portion 10 constituting the water-stopping portion 4 than in the covered portions 20. As described above, with the production method in which the distances between the elemental wires 2*a* in the exposed portion 10 are increased, and in this state, the gaps between the elemental wires 2*a* are filled with the water-stopping agent 5, and after the filling step, the distances between the elemental wires 2*a* in the exposed portion 10 are reduced while decreasing the twist pitch of the elemental wires 2*a* (retightening step), an advantageous effect of easily holding the water-stopping agent 5 in the gaps between the elemental wires 2*a* is realized. Also, by decreasing the twist pitch of the elemental wires 2*a* in the exposed portion 10 relative to the twist pitch in the covered portions 20 in the retightening step, the effect of holding the water-stopping agent 5 in the gaps between the elemental wires 2*a* is particularly improved. Accordingly, the feature of the ellipticity of the elemental wires 2*a* in a cross-section being smaller in the exposed portion 10 than in the covered portion 20 functions as a good indicator for use when the water-stopping portion 4 having a superior water-stopping performance is formed.

Furthermore, a water-stopping agent filling rate can be used as an indicator for evaluating whether or not the gaps between the elemental wires 2*a* in the inter-elemental-wire filling area of the water-stopping portion 4 are filled with a sufficient amount of water-stopping agent 5. A water-stopping agent filling rate is defined as a ratio of an area (A1) of a region between the elemental wires 2*a* filled with the water-stopping agent 5 to a total area (A0) of a region occupied by the conductor 2 and a region enclosed by the conductor 2 in a cross section of the water-stopping portion 4 (A1/A0×100%). For example, in a cross section of the water-stopping portion 4, using the area (A0) of the polygonal region obtained by connecting the centers of the elemental wires 2*a*1 located in the outer circumferential portion of the conductor together as a reference, a water-stopping agent filling rate can be calculated as a ratio of the area (A1) of the region filled with the water-stopping agent 5 to the area (A0). For example, if the water-stopping agent filling rate is at least 5%, and specifically at least 10%, it is conceivable that the gaps between the elemental wires 2*a* are filled with an amount of water-stopping agent 5 that is sufficient for ensuring a superior water-stopping performance. On the other hand, the water-stopping agent filling rate is preferably kept at not greater than 90%, in view of avoiding the use of an excessive amount of water-stopping agent 5.

Also, as described above, the surface of an elemental wire 2*a* preferably does not contact the bubble B, may be in contact with the water-stopping agent 5, or may be in contact with another elemental wire 2*a*, but it is preferable that the surface be in contact only with the water-stopping agent 5 in view of easily ensuring a superior water-stopping performance. Based on this view, in a cross section of the water-stopping portion 4, the sum of the lengths of the portions in the circumference of the elemental wires 2*a* that are not in contact with the bubble B or adjacent elemental wires 2*a* but are in contact with the water-stopping agent 5 is preferably at least 80% of the sum of the circumferential lengths of all the elemental wires 2*a*. Also, since it is easier to fill a gap between elemental wires 2*a* with the water-stopping agent 5 when the distance between the adjacent elemental wires 2*a* is sufficiently large, it is preferable that a cross section of the water-stopping portion 4 include a portion which is occupied by the water-stopping agent 5 and in which the distance between adjacent elemental wires 2*a* is at least 30% of the outer diameter of the elemental wires 2*a*.

<Constitution of Wire Harness>

Figure 5:
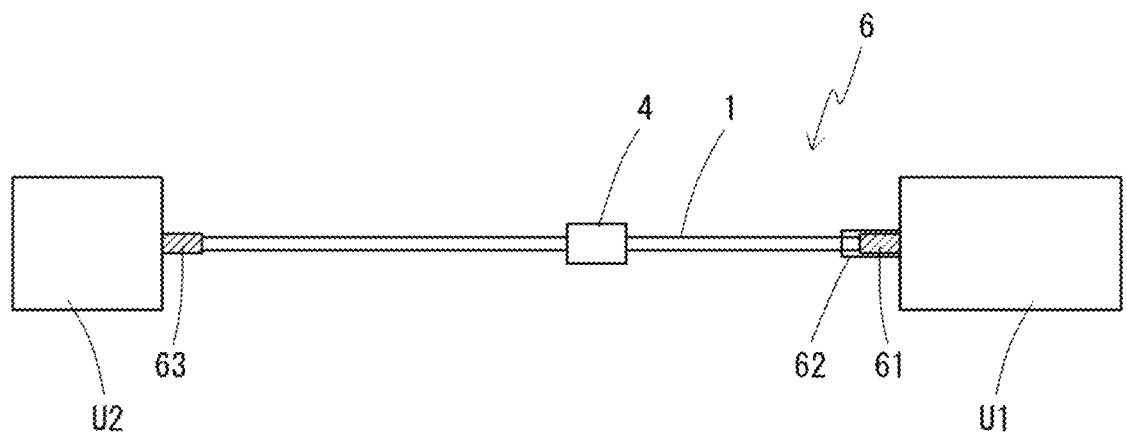
FIG. 5 is a schematic side view illustrating a wire harness according to an embodiment of the present disclosure along with devices connected to its both ends.

A wire harness 6 according to an embodiment of the present disclosure includes the insulated electric wire 1 with the water-stopping portion 4 according to the embodiment of the present disclosure. FIG. 5 illustrates an example of the wire harness 6 according to the present embodiment. The insulated electric wire constituting the wire harness 6 is provided with, at the respective ends thereof, electric connections 61 and 63 such as connectors that are capable of connecting to other device U1 and U2. The wire harness 6 may include, in addition to the above-described insulated electric wire 1 according to the embodiment, another type of insulated electric wire (not shown).

The wire harness 6 may employ any type of electric connections 61 and 63 provided at the respective ends of the insulated electric wire 1, and any type of devices U1 and U2 to which the electric connections 61 and 63 are connected, but an appropriate insulated electric wire 1 is such that one end thereof is waterproof while the other end is not waterproof, in view of efficient use of the water-stopping performance with the water-stopping portion 4.

As such an embodiment, the first electric connection 61 provided at one end of the insulated electric wire 1 includes a waterproof structure 62, as shown in FIG. 5. An example of the waterproof structure 62 is such that the connector constituting the first electric connection 61 is provided with a rubber stopper for sealing a space between a connector housing and a connector terminal. With the waterproof structure 62, even if water adheres to the surface or the like of the first electric connection 61, the water is unlikely to enter the first electric connection 61.

On the other hand, the second electric connection 63 provided at the other end of the insulated electric wire 1 does not include a waterproof structure as included in the first electric connection 61. Accordingly, if water adheres to the surface or the like of the second electric connection 63, the water may enter the second electric connection 63.

The exposed portion 10 in which the conductor 2 is exposed is formed in a middle portion of the insulated electric wire 1 constituting the wire harness 6, that is, at a position between the first electric connection 61 and the second electric connection 63, and in an area that includes this exposed portion 10, the water-stopping portion 4 filled with the water-stopping agent 5 is formed. There is no particular limitation to the specific position and number of the water-stopping portions 4, but at least one water-stopping portion 4 is preferably provided at a position closer to the first electric connection 61 than the second electric connection 63, in view of effectively suppressing the influence of water on the first electric connection 61 that has the waterproof structure 62.

The wire harness 6 including electric connections 61 and at both ends of the insulated electric wire 1 can be used to electrically connect two devices U1 and U2. For example, the first device U1 to which the first electric connection 61 having the waterproof structure 62 is connected may be a device such as an electric control unit (ECU) that requires waterproofing. On the other hand, the second device U2 to which the second electric connection 63 without any waterproof structure is connected may be a device that does not require waterproofing.

As a result of the insulated electric wire 1 constituting the wire harness 6 including the water-stopping portion 4, even if water that has externally entered the wire harness 6 moves along the elemental wires 2a constituting the conductor 2, it is possible to suppress the movement of the water along the insulated electric wire 1 from progressing beyond the water-stopping portion 4. That is to say, it is possible to suppress external water from moving beyond the water-stopping portion 4, reaching the electric connections 61 and 63 at both ends, and further entering the devices U1 and U2 connected to the electric connections 61 and 63. For example, even if water adhering to the surface of the second electric connection 63 without any waterproof structure enters the second electric connection 63, and moves along the insulated electric wire via the elemental wires 2a constituting the conductor 2, the movement of the water is stopped by the water-stopping agent 5 with which the water-stopping portion 4 is filled. As a result, the water cannot move to the side on which the first electric connection 61 is provided beyond the water-stopping portion 4, and can neither reach the position of the first electric connection 61 nor enter the first electric connection 61 and the first device U1. By suppressing water movement by the water-stopping portion 4 in this way, it is possible to efficiently use the waterproof characteristics with the waterproof structure 62 with respect to the first electric connection 61 and the device U1.

The effect of suppressing movement of water using the water-stopping portion 4 provided on the insulated electric wire is realized regardless of the position at which the water adheres, the cause thereof, or the environment when or after the water adheres. For example, when the wire harness 6 is installed in an automobile, water that has entered a portion of the insulated electric wire 1, such as a gap between the elemental wires 2a, from the non-waterproof second electric connection 63 can be efficiently prevented from entering the first electric connection 61 having the waterproof structure 62 and the first device U1, due to capillary action or cold breathing. "Cold breathing" refers to a phenomenon in which, when the first electric connection 61 having the waterproof structure 62 and the first device U1 are heated when the automobile is driven for example, and then heat is discharged, the pressure on the first electric connection 61 side becomes lower and the pressure on the second electric connection 63 side becomes relatively higher, so that a difference in pressure occurs along the insulated electric wire 1, and water adhering to the second electric connection 63 climbs toward the first electric connection and the first device U1.

<Insulated Electric Wire Production Method>

Next, an insulated electric wire production method according to the embodiment of the present disclosure that can suitably produce the insulated electric wire 1 according to the embodiment is described.

Figure 6:
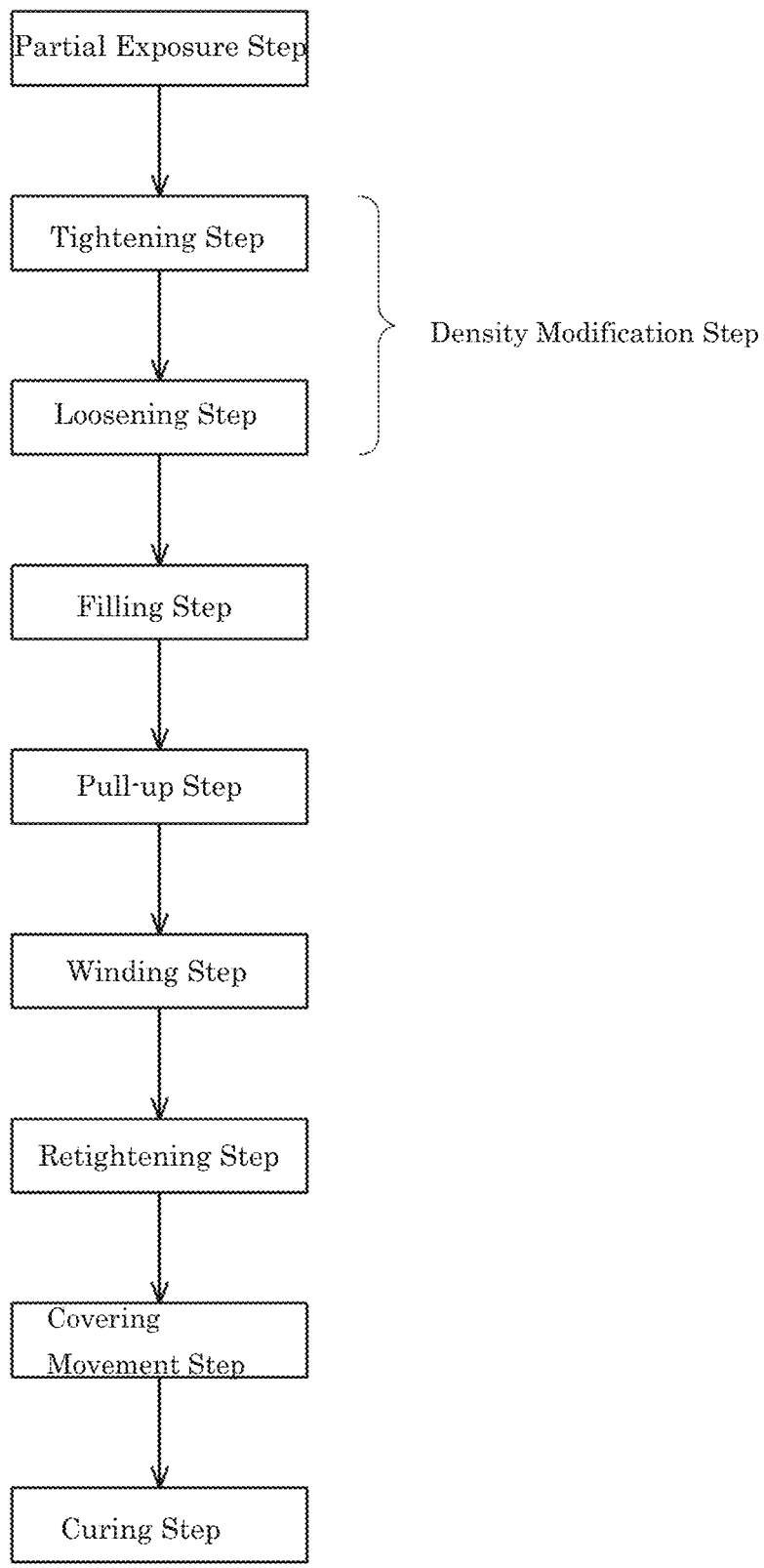
FIG. 6 is a flowchart illustrating steps for producing the insulated electric wire according to the embodiment.
Figure 7:
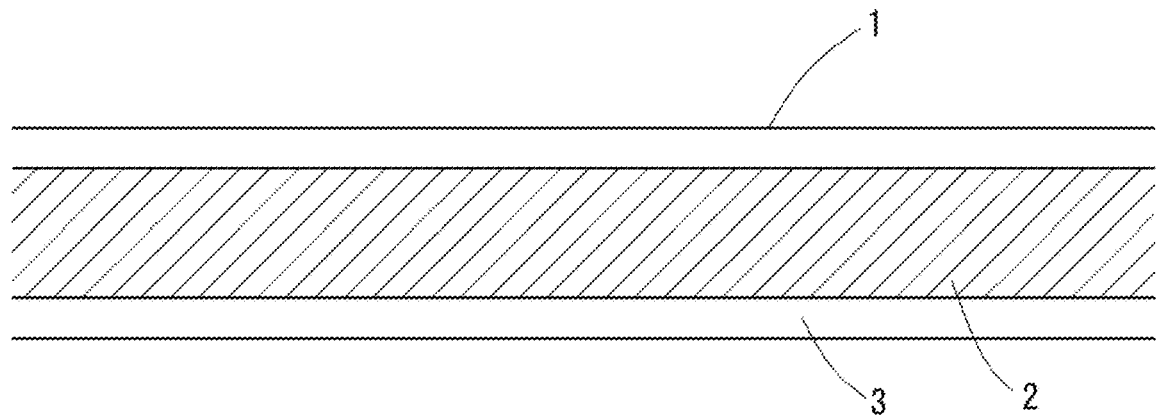
FIGS. 7A to 7C are cross-sectional views of the insulated electric wire, illustrating steps for producing the insulated electric wire.
Figure 7:
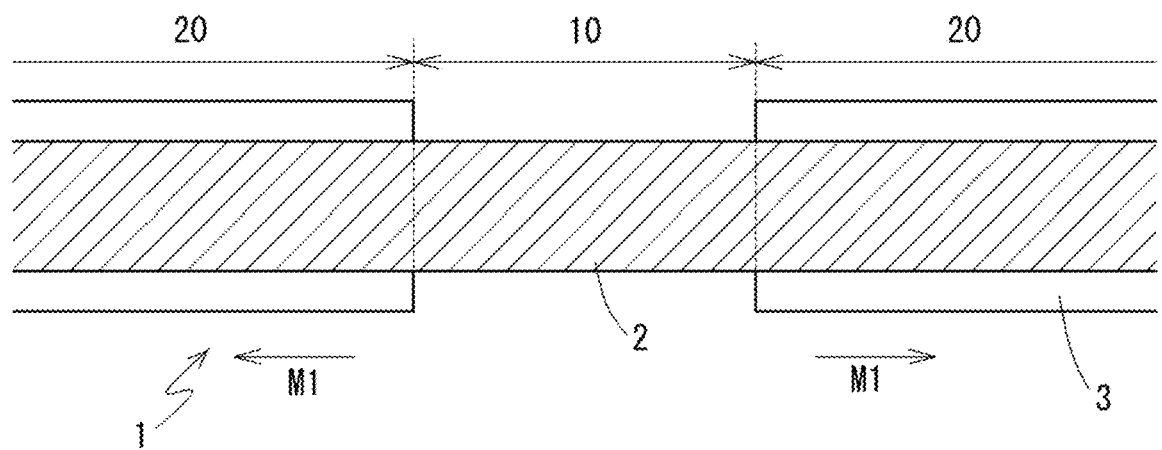
Figure 7:
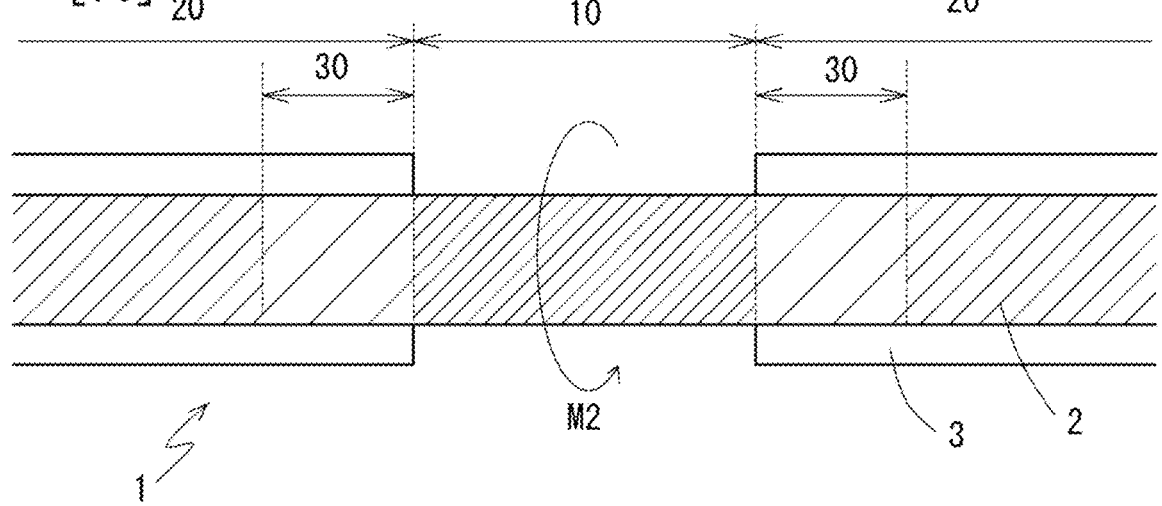
Figure 8:
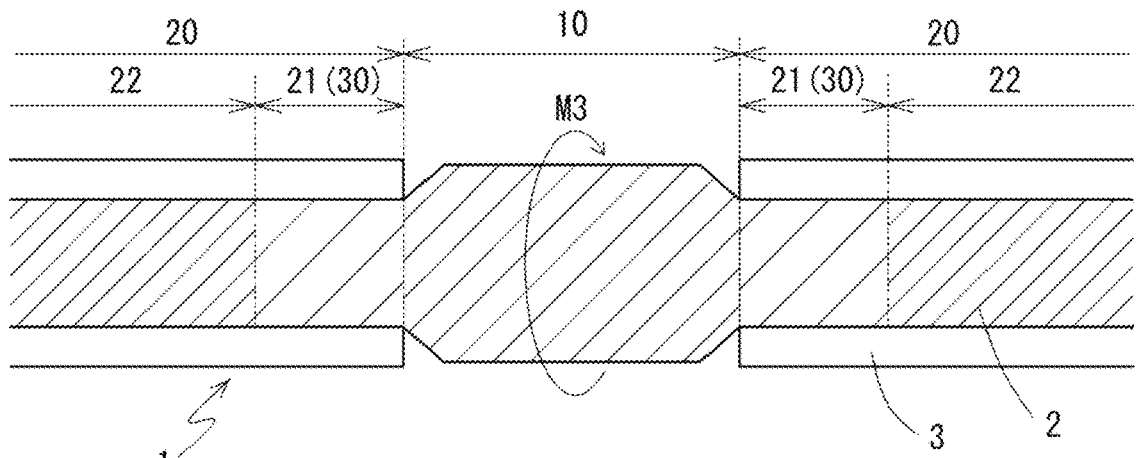
FIGS. 8A to 8C are cross-sectional views of the insulated electric wire, illustrating steps for producing the insulated electric wire.
Figure 8:
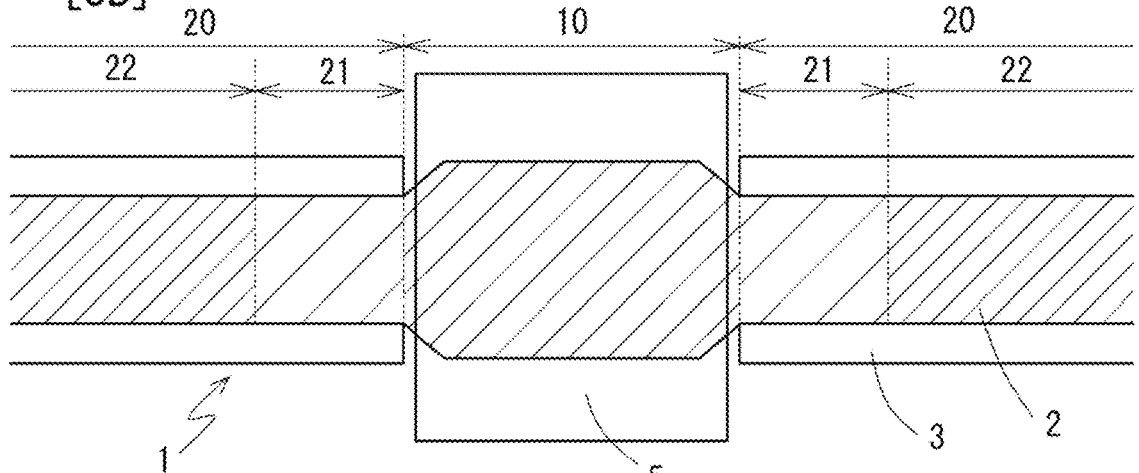
Figure 8:
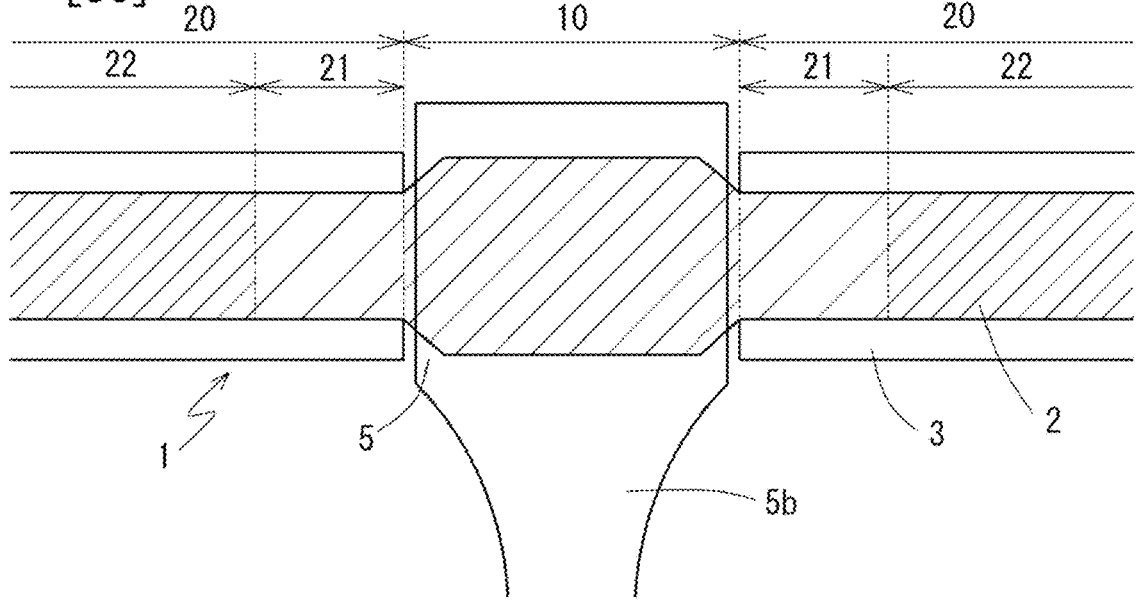
Figure 9:
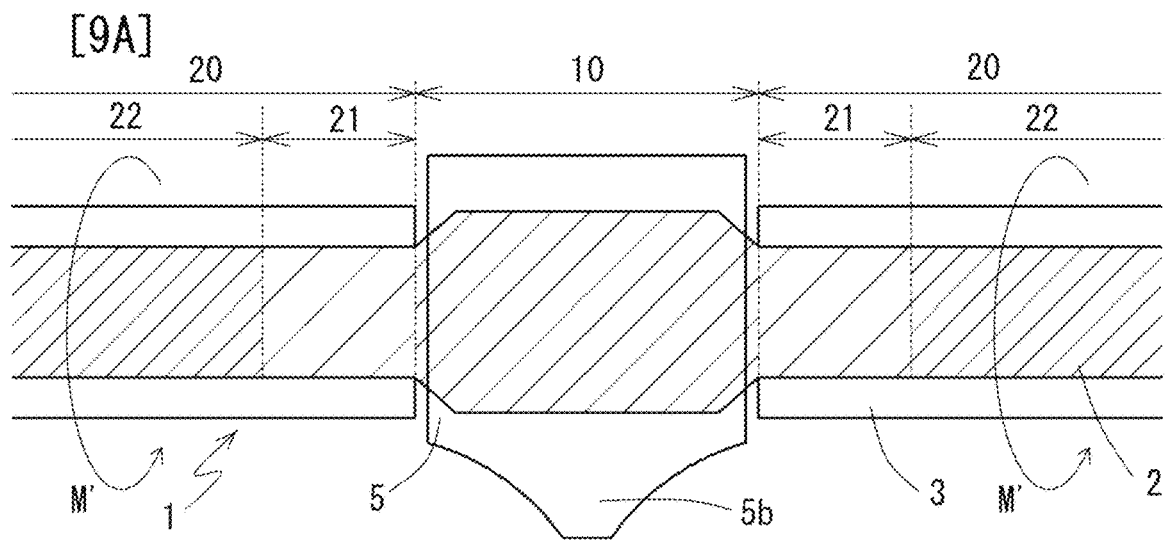
FIGS. 9A to 9C are cross-sectional views of the insulated electric wire, illustrating steps for producing the insulated electric wire.
Figure 9:
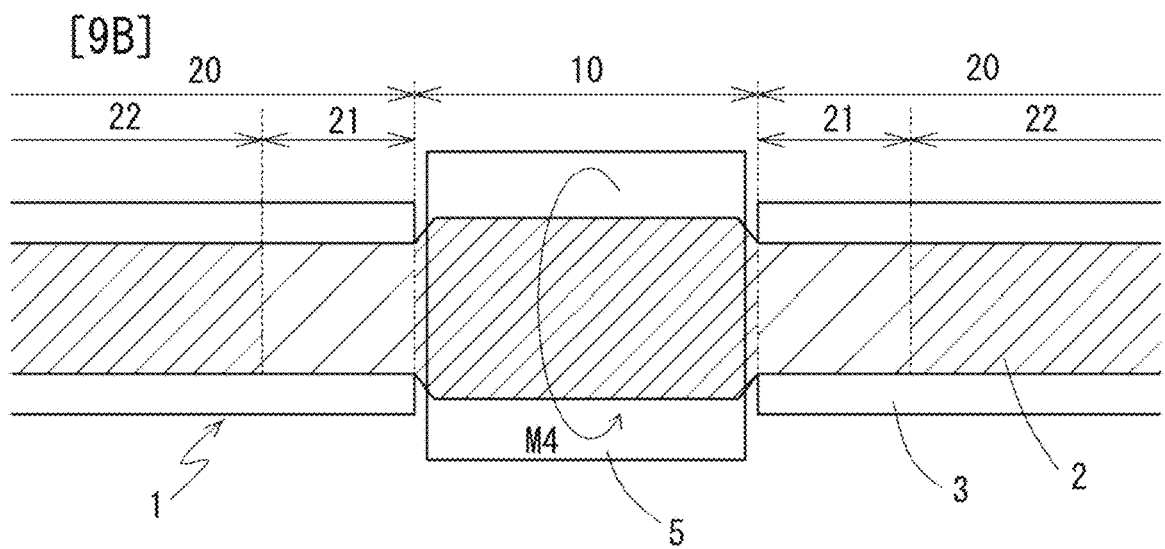
Figure 9:
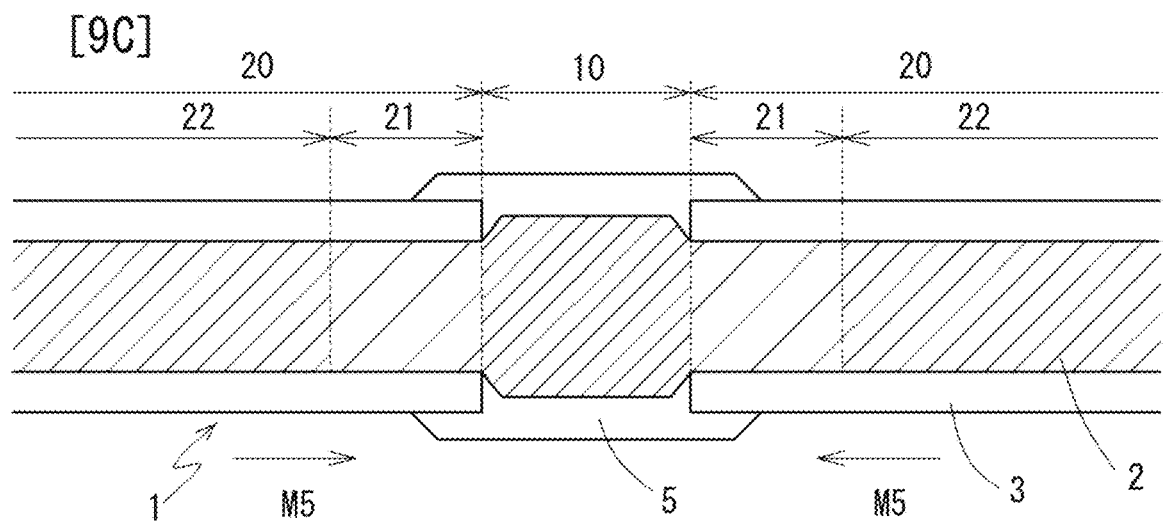

FIG. 6 schematically illustrates the production method. In this method, the water-stopping portion 4 is formed in a partial area of the insulated electric wire 1 in the longitudinal axis direction thereof by performing: (1) a partial exposure step; (2) a density modification step; (3) a filling step; (4) a pulling-up step; (5) a winding step; (6) a retightening step; (7) a covering movement step; and (8) a curing step, in this order. The density modification step (2) may include: (2-1) a tightening step; and subsequently (2-2) a loosening step. The steps will be explained below. Note here that a case in which the water-stopping portion is formed in a middle portion of the insulated electric wire 1 will be described, specific operations in the steps and the order of the steps may be adjusted as appropriate in accordance with details of the configuration of a water-stopping portion 4 to be formed, such as a position at which the water-stopping portion 4 is to be formed.

(1) Partial Exposure Step

First, in the partial exposure step, an exposed portion 10 as shown in FIG. 7B is formed in a continuous linear insulated electric wire as shown in FIG. 7A. The covered portions 20 are provided adjacent to the each side of the exposed portion 10 in the longitudinal axis direction thereof.

In an example of the method for forming such an exposed portion 10, a substantially ring-shaped slit is formed in the outer circumference of the insulation covering 3 substantially at the center of the area in which the exposed portion 10 is to be formed. Then, the regions of the insulation covering 3 located on each side of the slit are held from their outer circumference, and are pulled apart along the axial direction of the insulated electric wire 1 (movement M1). Along with this movement, the conductor 2 is exposed between the regions of the insulation covering 3 on both sides. In such a way, the exposed portion 10 is formed adjacent to the covered portions 20.

(2) Density Modification Step

Although the filling step may be performed and the gaps between the elemental wires 2a constituting the conductor 2 in the exposed portion 10 may be filled with the water-stopping agent 5 directly after the exposed portion 10 in which the conductor 2 is exposed has been formed in the partial exposure step, it is preferable to perform the density modification step before the filling step such that the gaps between the elemental wires 2a are widened, and the water-stopping agent 5 can fill the gaps with high uniformity.

In the density modification step, a non-uniform distribution of the density of the metal material is formed among the exposed portion 10 on the one hand, and the adjacent areas 21 and the remote areas 22 of the covered portions 20 on the other hand, and the distances between the elemental wires 2a of the conductor 2 are increased in the exposed portion 10. Specifically, the non-uniform distribution of the density of the metal material is formed such that the density of the metal material per unit length is higher in the exposed portion 10 than in the remote areas 22. Such density distribution can be formed at the same time as when increasing the distances between the elemental wires 2a in the exposed portion 10 in the tightening step and the subsequent loosening step, for example.

(2-1) Tightening Step

As shown in FIG. 7C, in the tightening step, the twist of the elemental wires 2a in the exposed portion 10 is temporarily tightened relative to the original state. Specifically, the insulated electric wire 1 is twisted and rotated in the direction of the twist of the elemental wires 2a so that the twist is further tightened (movement M2). With this, the twist pitch of the elemental wires 2a in the exposed portion 10 is reduced, and the distances between the elemental wires 2a are reduced.

During this operation, when the covered portions 20 located on the each side of the exposed portion 10 are externally held at portions adjacent to the exposed portion 10, and the conductor 2 is twisted so that the holding portions (i.e., holding portions 30) are rotated in mutually opposite directions, the conductor 2 can be unwound from the holding portions 30 toward the exposed portion 10. As a result of the unwinding of the conductor 2, the twist pitch of the elemental wires 2a in the holding portions is increased relative to the original pitch, and the density of the metal material per unit length is reduced from the original density, as shown in FIG. 7C. Consequently, a portion of the metal material originally located in the holding portions 30 is shifted to the exposed portion 10, and the twist pitch of the elemental wires 2a in the exposed portion 10 is reduced by this shift. Also, the density of the metal material per unit length in the exposed portion 10 is increased. Note that it is preferable that a force of holding the insulated electric wire 1 in the holding portions from the outer circumferential side be suppressed enough to allow the relative movement of the conductor 2 with respect to the insulation covering 3, in view of smoothly unwinding the conductor from the holding portions 30 toward the exposed portion 10.

(2-2) Loosening Step

Thereafter, as shown in FIG. 8A, in the loosening step, the twist of the elemental wires 2a in the exposed portion 10 is loosened again from the state where the twist has been tightened in the tightening step. The twist can be loosened by simply releasing the holding of the holding portions 30 or by holding the holding portions 30 and twisting and rotating the holding portions in the direction opposite to the tightening direction of the tightening step, that is, the direction opposite to the twist direction of the conductor 2 (movement M3).

During the operation, the portions of the conductor 2 unwound from the holding portions 30 located on the each side of the exposed portion 10 in the tightening step do not fully return into the areas covered with the insulation covering 3 due to the rigidity of the conductor 2, and at least partially remain in the exposed portion 10. As a result, the twist of the elemental wires 2a of the conductor 2 is loosened with the conductor 2 unwound to the exposed portion 10, and thus a state is realized in which the elemental wires 2a whose actual length is larger than the length before the tightening step is performed are bent and disposed in the exposed portion 10. That is, as shown in FIG. 8A, in the exposed portion 10, the diameter of the area constituted entirely by the conductor 2 is larger than the diameter before the tightening step is performed (in FIG. 7B), and the density of the metal material per unit length is increased. The twist pitch of the elemental wires 2a in the exposed portion 10 is at least larger than the twist pitch in the state where the twist is tightened in the tightening step, and is larger than the twist pitch before the tightening step is performed depending on the degree of loosening. In view of increasing the distances between the elemental wires 2a, the twist pitch of the elemental wires 2a in the exposed portion 10 is preferably larger than the twist pitch before the tightening step is performed.

After the loosening step, the holding portions 30 of the covered portions 20 where the insulation covering 3 was held externally in the tightening step serve as the adjacent areas 21 in which the density of the metal material per unit length is lower than that in the exposed portion 10, and is also lower than that in the state before the tightening step is performed. The areas of the covered portions 20 that have not functioned as the holding portions 30 in the tightening step, that is, the areas distanced from the exposed portion 10, are defined as the remote areas 22. In the remote areas 22, the states of the conductor 2, such as the density of the metal material per unit length and the twist pitch of the elemental wires 2a, do not substantially change from the states before the tightening step is performed. The portion of the metal material in the adjacent areas 21 obtained as a result of the reduction in the density per unit length is shifted to the exposed portion 10, and contributes to increasing the density of the metal material per unit length in the exposed portion 10. As a result, the exposed portion 10 has the highest density of the metal material per unit length, the remote areas 22 have the next highest density, and the adjacent areas 21 have the lowest density.

(3) Filling Step

Next, in the filling step, the gaps between the elemental wires 2a in the exposed portion 10 are filled with the uncured water-stopping agent 5, as shown in FIG. 8B. The filling operation with the water-stopping agent 5 is performed by immersing a region that is a part of the insulated electric wire 1 and includes the exposed portion 10 in a liquid of the water-stopping agent 5 such as the water-stopping agent 5 contained in a container or the water-stopping agent 5 jetted from a jet device. Due to this operation, a liquid resin composition is introduced into the gaps between the elemental wires 2a.

In the filling step, in addition to filling the gaps between the elemental wires 2a with the water-stopping agent 5, the water-stopping agent 5 is placed on the outer circumference of the conductor 2 in the exposed portion 10 as well. In this case, the water-stopping agent 5 may be placed on, in addition to the outer circumference of the exposed portion 10, the outer circumferential portion of the insulation covering 3 at the end portions of the covered portions 20. However, if the covering movement step is performed after the filling step, the water-stopping agent 5 introduced into the exposed portion 10 may be partially moved onto the outer circumferential portion of the insulation covering 3 in the covered portions 20 in the covering movement step. Accordingly, it is sufficient in the filling step if only the water-stopping agent 5 is placed on the outer circumference of the exposed portion 10 in addition to the gaps between the elemental wires 2a.

Since the distances between the elemental wires 2a in the exposed portion 10 are increased in the density modification step and then the water-stopping agent 5 is introduced into the exposed portion 10 in the filling step, the water-stopping agent 5 easily permeates the widened spaces between the elemental wires 2a. Accordingly, the water-stopping agent 5 can easily permeate every part of the exposed portion 10 evenly with high uniformity. Consequently, after the water-stopping agent 5 is cured, a reliable water-stopping portion 4 having an excellent water-stopping performance can be formed. Also, even if the water-stopping agent has a relatively high viscosity such as 4000 mPa·s or higher, the water-stopping agent 5 can permeate the gaps between the elemental wires 2a with high uniformity by sufficiently increasing the gaps between the elemental wires 2a. It is also possible to perform immersion of the insulated electric wire in the water-stopping agent 5 while rotating the insulated electric wire around its axis, in order to place the water-stopping agent 5 with high uniformity.

In the filling step, by immersing a region that is a part of the insulated electric wire 1 and includes the exposed portion in the liquid of the water-stopping agent 5, the water-stopping agent 5 is placed on the outer circumference of the region including the exposed portion 10, in addition to the gaps between the elemental wires 2a. At this time, if the immersion is performed in a state in which the exposed portion 10 as a whole as a larger outer diameter, a large amount of the water-stopping agent 5 is placed on the outer circumferential portion of the exposed portion 10 since the surface area of the exposed portion 10 as a whole is large, and it is easier to attain a state in which the outer circumference of the exposed portion 10 is covered with a large amount (large volume) of the water-stopping agent 5 after the next pulling-up step. This makes it easier to form the exposed-portion-outer-circumferential area in which the layer of the water-stopping agent 5 is thick and highly uniform in the water-stopping portion 4 to be eventually formed. Therefore, while the filling step and the subsequent pulling-up step are executed, it is preferable that the diameter of the entire exposed portion 10 is kept as large as possible. That is, it is preferable not to perform a twisting operation on the exposed portion 10 in the direction to tighten the twist of the elemental wires 2a constituting the conductor 2 while immersed in the water-stopping agent 5. Alternatively, even if such an operation is performed in a state in which the exposed portion 10 is immersed in the water-stopping agent 5 aiming at an improvement of the retainability of the water-stopping agent 5 in the areas between the elemental wires, it is preferable that the level of tightening, that is, the rate of reduction of the twist pitch of the elemental wires 2a, is kept low as compared to those in the subsequent retightening step.

(4) Pulling-Up Step

After the exposed portion 10 is sufficiently brought into contact with the water-stopping agent 5 in the filling step, the pulling-up step is executed. That is, a portion including the exposed portion 10 of the insulated wire 1 that was immersed in the waterproofing agent 5 is pulled upward from the liquid surface of the water-stopping agent 5 such that it does not contact the liquid of the water-stopping agent 5 that is stored. At this time, at least a part of the water-stopping agent 5 remains in the areas between the elemental wires 2a of the exposed portion 10 and the outer circumference of the region including the exposed portion 10. Also, as shown in FIG. 8C, a part of the water-stopping agent remaining in the outer circumference of the region including the exposed portion 10 drops downward due to the gravity and forms the dropping portion 5b. At this time, as shown in FIG. 8C, the dropping portion 5b tends to be in a tapered shape with the central region of the exposed portion 10 dropping further downward.

In the present embodiment, no operation is performed or only a low degree of operation is performed to the exposed portion while immersed in the water-stopping agent 5 when conducting the filling step prior to the pulling-up step, the operation twisting in the direction to tighten the twist of the elemental wires 2a, and the outer diameter of the exposed portion 10 is kept large, and the exposed portion 10 as a whole has a large surface area. Therefore, when the pulling-up step is executed thereafter, as FIG. 11A schematically illustrates the outline shape of the conductor 2 and the distribution of the water-stopping agent 5, a large amount of the water-stopping agent 5 remains on the outer circumference of the exposed portion 10. Then, since the large amount of the held water-stopping agent 5 drops, the dropping of the water-stopping agent 5 occurs relatively with high uniformity over the entire exposed portion 10 in the longitudinal axis direction, and the level of tapering of the shape of the dropping portion 5b decreases. In this manner, due to a reduction of the difference in the level of the dropping of the water-stopping agent over the entire exposed portion 10, the uniformity of the amount of the water-stopping agent 5 remaining on the outer circumference of the conductor 2 increases at each position in the longitudinal axis direction in the exposed-portion-outer-circumferential area of the water-stopping portion 4 formed after the subsequent steps. That is, in the exposed-portion-outer-circumferential area 42, a non-uniform distribution of the outer diameter is unlikely to be generated, and a straight water-stopping portion having a smooth surface tends to be easily formed.

In contrast, if, while the filling step is executed, the conductor 2 constituting the exposed portion 10 is twisted in the water-stopping agent, the twist of the elemental wires 2a is tightened significantly and the outer diameter of the conductor is reduced, as shown in FIG. 11B, the amount of the water-stopping agent 5 remaining the outer circumference of the exposed portion after the pulling-up step decreases. Then, since the water-stopping agent 5 which remains such a small amount drops, the dropping of the water-stopping agent 5 does not occur much at portions of the exposed portion 10 corresponding to the outer sides in the longitudinal axis direction, and the dropping of the water-stopping agent 5 is relatively concentrated at the central portion of the exposed portion 10. That is, the level of tapering of the shape of the dropping portion 5b increases, and its central portion has a sharp dropping shape. Thus, in the exposed-portion-outer-circumferential area 42 of the water-stopping portion 4 formed after the subsequent steps, a relatively large amount of the water-stopping agent 5 remains on the outer circumference of the conductor 2 in outer regions, in the longitudinal axis direction, where the dropping amount is relatively small; on the other hand, at its central portion, a relatively large amount of the water-stopping agent 5 is lost from the outer circumferential portion of the conductor 2 due to the dropping, and the amount of the water-stopping agent 5 remaining the outer circumference of the conductor 2 decreases. As a result, the outer diameter of the exposed-portion-outer-circumferential area 42 is smaller at the central portion as compared with outer regions in the longitudinal axis direction, and a non-uniform distribution of the outer diameter is generated. A large irregular structure is formed on the surface of the water-stopping portion 4.

(5) Winding Step

Preferably, the winding step is executed after the pulling-up step is completed, that is, after the entire insulated electric wire 1 having been immersed in the water-stopping agent is pulled up to the outside of the liquid of the water-stopping agent 5. In the winding step, the dropping portion 5b where the water-stopping agent 5 drops downward from the insulated electric wire 1 (mainly the exposed portion 10) is wound around the outer circumference of the insulated electric wire 1 such that there is not a dropping part, or the dropping part is made small. Specifically, as shown in FIG. 9A, the entire insulated electric wire 1 only needs to be rotated around its axis (movement M'), and the dropping portion 5b which is dropping like a liquid film only needs to be wound around the outer circumference of the insulated electric wire 1.

By executing the winding step, the amount of loss of the water-stopping agent 5 due to dropping can be decreased. That is, the amount of the water-stopping agent 5 that remains the outer circumferential portion of the exposed portion 10 and becomes the exposed-portion-outer-circumferential area 42 can be increased. In this manner, it becomes easier to ensure that the thickness of the layer of the water-stopping agent 5 in the exposed-portion-outer-circumferential area 42 is sufficiently large. Also, the dropping portion 5b has a tapered shape, and the amount of the dropping water-stopping agent 5 relatively increases at the central portion of the exposed portion 10 in the longitudinal axis direction, but, by winding the water-stopping agent 5 that is dropping at positions located in the longitudinal axis direction, it is possible to reduce differences among the amounts of the water-stopping agent 5 remaining at positions on the outer circumference of exposed portion 10 as compared with the case where that the winding is not performed. In the production method according to the present embodiment, as in FIG. 11A, the filling step and the pulling-up step are executed while the outer diameter of the exposed portion 10 is kept large. Accordingly, as described regarding the pulling-up step, the uniformity of dropping amounts of the water-stopping agent 5 is made high in the longitudinal axis direction of the exposed portion 10, and, by further executing the winding step, the uniformity of the thickness of the layer of the water-stopping agent 5 and the outer diameter of the exposed-portion-outer-circumferential area 42 can be improved further. Note that the next retightening step may be executed after the winding step is completed, or the winding step may be executed during the retightening step. In the latter case, an operation of rotating the insulated electric wire 1 around its axis (movement M') and an operation of twisting (movement M4) may be performed simultaneously or continuously.

(6) Retightening Step

After the pulling-up step is completed, and the winding step is performed further as desired, next, the retightening step is executed. In the retightening step, as shown in FIG. 9B, the distances between the elemental wires 2a are reduced in the exposed portion 10 in the state in which the gaps between the elemental wires 2a are filled with the water-stopping agent 5. Similar to the aforementioned tightening step in the density modification step for example, this step can be performed such that the covered portions 20 located on the each side of the exposed portion 10 are held at the adjacent areas 21 externally from the insulation covering 3, and the conductor 2 is twisted and rotated in the direction of the twist of the elemental wires 2a so that the twist of the elemental wires 2a is tightened (movement M4). Note that in contrast to the tightening step, an operation of unwinding the conductor 2 to the exposed portion 10 is not performed in the retightening step.

When the gaps between the elemental wires 2a in the exposed portion 10 are narrowed in the retightening step, the water-stopping agent 5 is confined in the narrowed gaps. Thus, the water-stopping agent 5 is likely to stay in the gaps between the elemental wires 2a without flowing or dropping until the fluidity of the water-stopping agent 5 is sufficiently lowered due to curing or the like. Accordingly, after the water-stopping agent 5 is cured, a reliable water-stopping portion 4 having an excellent water-stopping performance is easily formed. To increase the effect, it is preferable that the twist pitch of the elemental wires 2a in the exposed portion 10 be reduced in the retightening step. For instance, it is preferable that after the retightening step, the twist pitch of the elemental wires 2a be smaller in the exposed portion 10 than in the adjacent areas 21 as well as in the remote areas 22. Also, after the retightening step, the exposed portion is preferably given an outer diameter approximately the same as that of the covered portions 20.

The retightening step is preferably performed while the water-stopping agent 5 filling up the gaps between the elemental wires 2a is flowable, that is, before the water-stopping agent 5 is cured or during the curing process. Accordingly, the retightening operation is unlikely to be impaired by the water-stopping agent 5. If, while the filling step is being performed, the conductor 2 is twisted in the liquid of the water-stopping agent 5, and a lower level of tightening is already performed, a higher level of tightening than the lower level of tightening may be executed in the retightening step. That is, the rate of change of the twist pitch may be increased as compared to the aforementioned tightening performed in the liquid.

(7) Covering Movement Step

Next, in the covering movement step, as shown in FIG. 9C, the regions of the insulation covering 3 located in the covered portions 20 on the each side of the exposed portion 10 may be moved towards the exposed portion 10, approaching each other (movement M5). Similar to the retightening step, the covering movement step is preferably performed while the water-stopping agent 5 filling up the exposed portion 10 is flowable, that is, before the water-stopping agent 5 is cured or during the curing process. The covering movement step and the retightening step may also be performed substantially in a single operation.

Even if there is an area in which the gaps between the elemental wires 2a cannot be filled with the sufficient amount of water-stopping agent 5 in the filling step at an end of the exposed portion 10 or the like, the water-stopping agent 5 will reach such an area in the covering movement step, and a state will be realized in which the gaps between the elemental wires 2a are filled with the water-stopping agent 5 in the entire exposed portion 10 in which the conductor 2 is exposed. Furthermore, a part of the water-stopping agent 5 placed on the outer circumference of the conductor 2 in the exposed portion 10 can be moved to the outer circumference of the insulation covering 3 in the covered portions 20. Thus, the water-stopping agent 5 is continuously placed over three areas, namely, the gaps between the elemental wires 2a in the exposed portion 10, the outer circumference of the conductor in the exposed portion 10, and the outer circumferences of the parts of the insulation covering 3 at the ends of the covered portions 20.

Since the water-stopping agent 5 is placed over the three areas, it is possible to form a water-stopping portion 4 continuously having the inter-elemental-wire filling area 41, the exposed-portion-outer-circumferential area 42, and the covered-portion-outer-circumferential areas 43 after the completion of the subsequent curing step. That is, it is possible to form a water-stopping portion 4 that has an excellent water-stopping performance in the areas between the elemental wires 2a, has an outer circumference physically protected and electrically insulated, and has an excellent water-stopping performance between the conductor 2 and the insulation covering 3, using the same material at the same time. The covering movement step may be omitted if, in the filling step, a sufficient amount of water-stopping agent 5 can be introduced into an area extending over the entire exposed portion 10, and further to an area including the end portions of the covered portions 20 located on the each side of the exposed portion 10, for example.

(8) Curing Step

Finally, in the curing step, the water-stopping agent 5 is cured. At this time, a curing method that corresponds to the type of curability of the water-stopping agent 5 only needs to be used. For example, if the water-stopping agent 5 has heat curability, it may be cured by heating, if the water-stopping agent has light curability, it may be cured by light irradiation, if the water-stopping agent 5 has moisture curability, it may be cured by humidification by being left in the air, or the like.

In the curing step, as shown in FIG. 10, the insulated electric wire 1 is preferably rotated around its axis (movement M6) until the water-stopping agent 5 is fully cured. If the water-stopping agent 5 is cured without rotating the insulated electric wire 1, that is, while the insulated electric wire 1 remains unmoved, the uncured water-stopping agent 5 will drop in accordance with gravity, and the water-stopping agent 5 will be cured in a state in which a thicker layer of the water-stopping agent 5 is formed at a lower position in the gravity direction than at a higher position. Thus, the conductor 2 is likely to be eccentric in the water-stopping portion 4 obtained after curing the water-stopping agent 5, and non-uniformity of the water-stopping performance or the physical characteristics may occur in the circumferential direction of the insulated electric wire 1. For example, the material strength or the water-stopping performance of the water-stopping agent 5 may be impaired in a portion in which the layer thickness of the water-stopping agent 5 is thin, while the water-stopping agent 5 is likely to be damaged due to a contact with an external object in a portion in which the layer thickness of the water-stopping agent 5 is thick.

Accordingly, by performing the curing step while rotating the insulated electric wire 1 around its axis, the uncured water-stopping agent 5 is unlikely to remain at one position in the circumferential direction of the insulated electric wire 1, and the layer of the water-stopping agent 5 is likely to have a highly uniform thickness around the entire circumference. Thus, it becomes easier to obtain a water-stopping portion 4 having a straight shape, and the eccentricity of the conductor 2 in the water-stopping portion 4 is reduced, making it possible to realize a water-stopping portion 4 having highly uniform water-stopping performance and physical characteristics over the entire circumference. Furthermore, if the water-stopping agent 5 has light curability, it is possible to irradiate the entire insulated electric wire 1 in the circumferential direction with light L from a light source 80 by performing the curing step while rotating the insulated electric wire 1 around its axis, thus making it possible to uniformly progress light curing of the water-stopping agent 5 over the entire circumference. Note that, if after the completion of the filling step, the pulling-up step, the winding step, the retightening step, and the covering movement step, time is required before the curing step is started, due to moving the insulated electric wire 1 between the processing devices, or the like, it is preferable to rotate the insulated electric wire 1 around its axis, and suppress dropping of the water-stopping agent 5 at a particular position in the circumferential direction also for that time.

EXAMPLE

Hereinafter, an example will be described. Note, however, that the present invention is not limited to this example.
(Test Method)
(1) Preparation of Samples An insulated electric wire was prepared by covering the outer circumference of a copper stranded conductor having a conductor cross-sectional area of 0.5 mm$^2$ (diameter of elemental wires: 0.32 mm; number of elemental wires: 7) with a PVC insulation covering having a thickness of 0.3 mm. An exposed portion having a length of 13 mm was formed at a middle portion of the insulated electric wire. Then, a water-stopping agent was used to form a water-stopping portion in the exposed portion. As the water-stopping agent, ThreeBond "3065E" (viscosity: 7000 mPa·s), which is a resin having anaerobic curability, was used.

As samples, two types, the sample A and the sample B, were prepared by using different methods for forming water-stopping portions. For the sample A, steps were executed in the order shown in the flowchart of FIG. 6, and the water-stopping portion was formed. That is, an operation of tightening the twist of a conductor was not performed in the filling step, but the retightening step was executed through the winding step after the pulling-up step being performed. On the other hand, for the sample B, in the flowchart in FIG. 6, instead of performing the retightening step after the pulling-up step and the winding step, the retightening step was executed by twisting a conductor in a state in which a region including an exposed portion was immersed in a liquid of a water-stopping agent in the filling step. Thereafter, the pulling-up step and the winding step were executed. Ten individual samples were produced for each of the sample A and the sample B.

(2) Evaluation of Outer Diameters of Water-Stopping Portions

Regarding each of the ten individual samples of each of the sample A and the sample B, defining a subject region as a region of the exposed-portion-outer-circumferential area of the water-stopping portion other than a region which has an increased diameter due to a thickness of the insulation covering, outer diameters were measured in the subject region. Then, the maximum outer diameter and the minimum outer diameter were recorded. Note that regions other than the subject region were regions that occupy approximately 15% of the length at each end portions of the exposed-portion-outer-circumferential area.
(Results)

Figure 12:
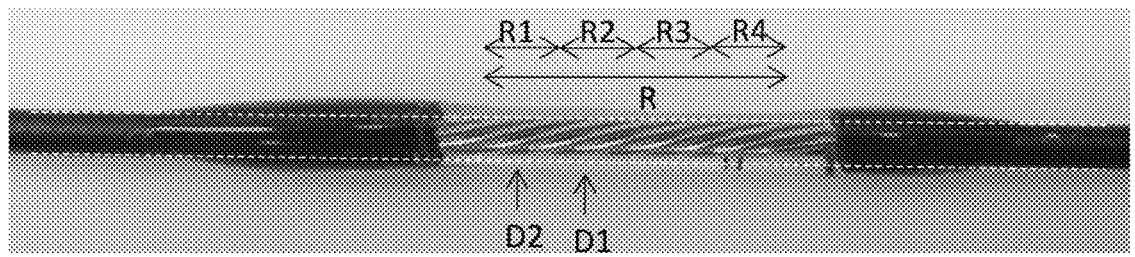
FIGS. 12A and 12B are pictures of the state of the water-stopping portion.
Figure 12:
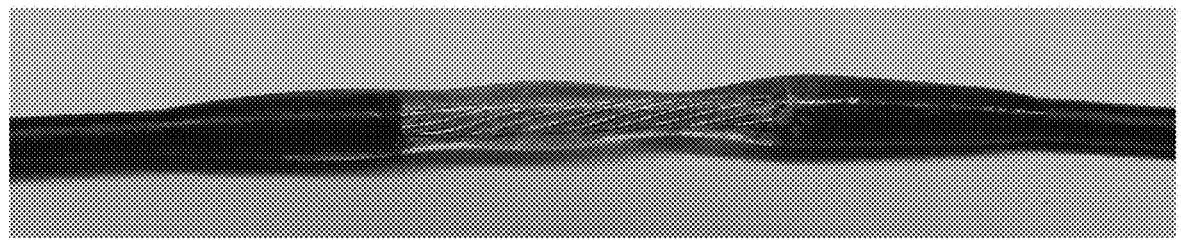

FIG. 12A and FIG. 12B respectively show pictures of water-stopping portions of representative individual samples of the sample A and the sample B. Also, the following Table 1 shows values of the maximum outer diameter D1 and the minimum outer diameter D2 obtained by measurement of ten individual samples of each of the sample A and the sample B. Along with them, a computed value of the rate of difference ΔD/D2 of each individual sample, and the maximum value, minimum value, and average of the rates of difference of all the individual samples are also shown.

TABLE 1

| | Sample A | | | | Sample B | | |
|---|---|---|---|---|---|---|---|
| Identification number | Maximum outer diameter D1 (mm) | Minimum outer diameter D2 (mm) | Rate of difference ΔD/D2 (%) | Identification number | Maximum outer diameter D1 (mm) | Minimum outer diameter D2 (mm) | Rate of difference ΔD/D2 (%) |
| 1 | 3.51 | 3.39 | 3.6% | 1 | 2.34 | 1.86 | 25.8% |
| 2 | 3.50 | 3.35 | 4.5% | 2 | 3.02 | 1.88 | 60.6% |
| 3 | 3.82 | 3.42 | 11.7% | 3 | 2.52 | 2.08 | 21.2% |
| 4 | 3.55 | 3.48 | 1.9% | 4 | 2.28 | 1.91 | 19.4% |
| 5 | 3.62 | 3.28 | 10.4% | 5 | 2.26 | 1.94 | 16.5% |
| 6 | 3.65 | 3.49 | 4.7% | 6 | 2.53 | 1.95 | 29.7% |
| 7 | 3.51 | 3.35 | 4.8% | 7 | 2.26 | 2.00 | 13.0% |
| 8 | 3.70 | 3.52 | 5.1% | 8 | 2.39 | 1.97 | 21.3% |
| 9 | 3.60 | 3.24 | 11.1% | 9 | 2.54 | 1.62 | 56.8% |
| 10 | 3.52 | 3.33 | 5.7% | 10 | 2.34 | 1.57 | 49.0% |
| | Maximum value | | 11.7% | | Maximum value | | 60.6% |
| | Minimum value | | 1.9% | | Minimum value | | 13.0% |
| | Average | | 6.3% | | Average | | 31.3% |

Visual comparison of pictures of the water-stopping portions of the sample A in FIG. 12A, and the sample B in FIG. 12B reveals that, in the sample A, a noticeable non-uniform distribution of the outer diameter of the exposed-portion-outer-circumferential area is not observed, and an exposed portion having a relatively straight smooth surface is formed. On the other hand, in the sample B, portions with large outer diameters and portions with small outer diameters were generated apparently in the exposed-portion-outer-circumferential area, and the water-stopping portion has on its surface a constricted irregular structure. In the sample A, a portion that has the maximum outer diameter denoted by a reference numeral D1 is positioned in R2 which is a central region in the regions R1 to R4 obtained by equally dividing the subject region R into four. A portion that has the minimum outer diameter denoted by a reference numeral D2 is positioned in the end region R1. Also, the outer diameters of portions that are parts of the covered portion, and do not have the water-stopping portion placed thereon are indicated by white dotted lines, and the entire water-stopping portion has outer diameters larger than those outer diameters.

According to Table 1, both the maximum outer diameter and the minimum outer diameter of the sample A are larger than those of the sample B, and the rate of difference is decreased noticeably. This corresponds to the fact that the comparison between FIGS. 12A and 12B reveals that the sample A has a smaller non-uniform distribution of the outer diameter of the exposed-portion-outer-circumferential area. All the individual samples of the sample A have rates of difference which are not greater than 12%, and the individual sample having the smallest rate of difference has a rate of difference equal to 1.9%, which is very small. On the other hand, all the individual samples of the sample B have rates of difference which are at least 13%, and the individual sample having the highest rate of difference has a rate of difference which is as high as at least 60%. It is confirmed from the results above that by executing the filling step while the diameter of the conductor remains large and executing the retightening step after pulling up the exposed portion from the water-stopping agent as done for the sample A, the rate of difference can be kept at not greater than 12%, and a water-stopping agent that excels in outer-diameter uniformity and thickness uniformity of the layer of the water-stopping agent can be formed.

Embodiments of the present disclosure have been described in detail, but the present invention is in no way restricted to the embodiments described above and can be modified variously in a range without departing from the gist of the present invention.

LIST OF REFERENCE NUMERALS

1 Insulated electric wire
2 Conductor
2a Elemental wire
2a1 Elemental wire positioned at outer circumferential portion of conductor
2a2 Elemental wire located inward of elemental wire 2a1
3 Insulation covering
4 Water-stopping portion
5 Water-stopping agent
5a Surface of water-stopping agent
5b Dropping portion
6 Wire harness
10 Exposed portion
20 Covered portion 21 Adjacent area
22 Remote area
30 Holding portion
41 Inter-elemental-wire filling area
42 Exposed-portion-outer-circumferential area
43 Covered-portion-outer-circumferential area
44 Taper portion
61 First electric connection
62 Waterproof structure
63 Second electric connection
80 Light source
B Bubble
D1 Maximum outer diameter
D2 Minimum outer diameter
L Light
La Thickness of layer of water-stopping agent in exposed-portion-outer-circumferential area
Lb Thickness of layer of water-stopping agent in covered-portion-outer-circumferential area
Lc Thickness of insulation covering
M1 to M6, M' Movement
R Subject region
R1, R4 Regions on both sides that are formed when subject region is equally divided into four
R2, R3 Central regions that are formed when subject region is equally divided into four

The invention claimed is:

1. An insulated electric wire comprising:
 a conductor in which a plurality of elemental wires made of a metal material are twisted together;
 an insulation covering that covers an outer circumference of the conductor;
 an exposed portion in which the insulation covering is removed from the outer circumference of the conductor;
 a covered portion in which the insulation covering covers the outer circumference of the conductor, the exposed portion and the covered portion being adjacent to each other in a longitudinal axis direction; and
 a water-stopping portion in which a water-stopping agent is over the exposed portion and over a part of the covered portion that is adjacent to the exposed portion; wherein
 the water-stopping portion continuously comprises:
  an inter-elemental-wire filling area where the water-stopping agent fills gaps between the elemental wires in the exposed portion,
  an exposed-portion-outer-circumferential area in which the water-stopping agent covers the outer circumference of the conductor in the exposed portion, and
  a covered-portion-outer-circumferential area in which the water-stopping agent covers an outer circumference of the insulation covering in a region that is a part of the covered portion and is adjacent to the exposed portion;
 a subject region is a region of the exposed-portion-outer-circumferential area other than a region closer to the covered-portion-outer-circumferential area which has an increased diameter due to a thickness of the insulation covering;
 a difference between a maximum outer diameter and a minimum outer diameter in the subject region is not greater than 12% of the minimum outer diameter; and
 a twist pitch of the elemental wires is smaller in the exposed portion than in an area of the covered portion.

2. The insulated electric wire according to claim 1, wherein, in the subject region, the difference between the maximum outer diameter and the minimum outer diameter is at least 1% of the minimum outer diameter.

3. The insulated electric wire according to claim 1, wherein the insulated electric wire comprises the covered portion and the covered-portion-outer-circumferential area on each sides side of the exposed portion in the longitudinal axis direction, and
 the maximum outer diameter is at either one of two central regions among four regions obtained by equally dividing the subject region into four in the longitudinal axis direction.

4. The insulated electric wire according to claim 1, wherein the water-stopping portion does not have a portion with an outer diameter smaller than an outer diameter of a portion that is a part of the covered portion and does not have the water-stopping agent thereon.

5. The insulated electric wire according to claim 1, wherein a thickness of a layer of the water-stopping agent is larger in the exposed-portion-outer-circumferential area than in the covered-portion-outer-circumferential area.

6. The insulated electric wire according to claim 1, wherein the water-stopping portion does not have a difference in height on an outer circumferential surface, except in end portions in the longitudinal axis direction, equal to or greater than a thickness of a layer of the water-stopping agent in the covered-portion-outer-circumferential area.

7. The insulated electric wire according to claim 6, wherein the water-stopping portion does not have a difference in height on the outer circumferential surface, except in the end portions in the longitudinal axis direction, equal to or greater than 20% of the thickness of the layer of the water-stopping agent in the covered-portion-outer-circumferential area.

8. The insulated electric wire according to claim 1, wherein a thickness of a layer of the water-stopping agent in the covered-portion-outer-circumferential area is smaller than the thickness of the insulation covering.

9. The insulated electric wire according to claim 1, wherein, at an end portion of the covered-portion-outer-circumferential area corresponding to an end portion of the entirety of the water-stopping portion in the longitudinal axis direction, the water-stopping portion has a taper structure in which a layer of the water-stopping agent decreases in thickness outward an outer side in the longitudinal axis direction.

10. A wire harness comprising the insulated electric wire according to claim 1.

11. A production method for an insulated electric wire for producing the insulated electric wire according to claim 1, the method comprising, in this order:
 providing, to the insulated electric wire, the exposed portion: and
 providing the covered portion;
 widening distances between the elemental wires in the exposed portion while increasing a density of conductive material per unit length in the exposed portion;
 immersing a region that is a part of the insulated electric wire and includes the exposed portion in a liquid of the water-stopping agent that is made of an insulating material, and filling gaps between the elemental wires with the water-stopping agent;
 pulling up the insulated electric wire from the water-stopping agent in a liquid state; and reducing the distances between the elemental wires in the exposed portion, and decreasing a twist pitch of the elemental wires.

12. The production method for an insulated electric wire for producing the insulated electric wire according to claim 11, further comprising rotating the insulated electric wire around its axis, and winding the water-stopping agent around an outer circumference of the insulated electric wire after the pulling up the insulated electric wire from the water-stopping agent but before or during the reducing the distances between the elemental wires in the exposed portion, and the decreasing the twist pitch of the elemental wires.

* * * * *